(12) United States Patent
Tsai et al.

(10) Patent No.: US 10,636,594 B2
(45) Date of Patent: *Apr. 28, 2020

(54) HAIR TRIGGER TRAVEL STOP WITH ON-DEMAND SWITCHING

(71) Applicant: Microsoft Technology Licensing, LLC, Redmond, WA (US)

(72) Inventors: Jason Victor Tsai, Bellevue, WA (US); Kenneth Dennis Jasinski, Seattle, WA (US); Jonathan Shea Robinson, Kirkland, WA (US); Gabriel Michael Rask Gassoway, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,417

(22) Filed: Jun. 13, 2019

(65) Prior Publication Data

US 2019/0393006 A1 Dec. 26, 2019

Related U.S. Application Data

(63) Continuation of application No. 14/723,185, filed on May 27, 2015, now Pat. No. 10,446,344.

(51) Int. Cl.
*H01H 21/22* (2006.01)
*G06F 3/0489* (2013.01)
*A63F 13/24* (2014.01)

(52) U.S. Cl.
CPC .............. *H01H 21/22* (2013.01); *A63F 13/24* (2014.09); *G06F 3/0489* (2013.01); *H01H 2221/016* (2013.01); *H01H 2231/008* (2013.01); *H01H 2231/032* (2013.01); *H01H 2235/00* (2013.01)

(58) Field of Classification Search
CPC ........ H01H 19/63; H01H 25/065; H01H 3/08; H01H 19/03; H01H 73/26; H01H 73/30; H01H 23/164; A63F 13/06; A63F 13/24; A63F 2300/1043; A63F 13/218
USPC ......... 200/341, 344, 336, 11 R, 564; 463/37, 463/16, 30, 36
See application file for complete search history.

(56) References Cited

U.S. PATENT DOCUMENTS 10,446,344 B2 * 10/2019 Tsai ..................... A63F 13/24

* cited by examiner

*Primary Examiner* — Ahmed M Saeed
(74) *Attorney, Agent, or Firm* — Fiala & Weaver P.L.L.C.

(57) ABSTRACT

Methods, systems, apparatuses, and computer program products are provided for a user input device, such as a game controller. The user input device includes a finger depressible trigger button, a trigger travel path adjustment assembly that resides in an internal cavity of a housing of the user input device, and a finger switch configured to be switched between a plurality of selectable positions in real-time (e.g., during game play). A first selectable position of the finger switch enables the trigger button to be depressed a first distance. A second selectable position of the finger switch enables the trigger button to be depressed a second distance that is greater than the first distance.

20 Claims, 10 Drawing Sheets

HAIR TRIGGER TRAVEL STOP WITH ON-DEMAND SWITCHING

CROSS REFERENCE TO RELATED APPLICATION

This application is a continuation of allowed U.S. application Ser. No. 14/723,185, filed on May 27, 2015, titled "Hair Trigger Travel Stop With On-Demand Switching," which is incorporated by reference herein in its entirety.

BACKGROUND

Various types of handheld device controllers exist, including handheld video game controllers. Game controllers are devices used with video game and/or entertainment systems to enable users to provide input, which may include controlling a character in a game, selecting audio and/or video content, and/or controlling other aspects related to the systems. A game controller may include left and right trigger buttons, which are continuous input buttons that can be used for a variety of game functions. Examples of game controllers having right and left trigger buttons include various types of Microsoft® Xbox® controllers developed by Microsoft Corporation of Redmond, Wash., United States, and the PlayStation® DualShock® 3 and 4 controllers, developed by Sony Computer Entertainment, Inc., of Tokyo, Japan.

For FPS (first person shooter) and similar games, the triggers are often used to fire a weapon simulated on screen. The triggers have a relatively long travel motion, and thus take time to fully depress. However, an initial, partial trigger depression can be used to cause the simulated weapon to fire, without fully depressing the trigger. Video game players ("gamers") who play at a competitive level prefer to be able to fire rounds repeatedly and in quick succession. As such, these gamers tend to partially depress and release the trigger repeatedly to fire more rapidly.

Some game controllers may add a physical barrier in the path of the trigger button, internal to the controller. This permanently reduces the travel of the trigger button, and makes rapid fire easier to perform. If the user wants to play with a normal amount of trigger button travel, they disassemble the game controller to remove the barrier, and then reassemble the game controller, using hand tools, taking time, and stopping game play. According to another technique, a barrier piece is inserted into the controller to provide shorter trigger travel. Controller disassembly is not required to adjust the trigger button travel, but instead a hand tool is used to turn a screw, which changes the amount of travel between short and normal distances. Gameplay is stopped to complete this task

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for a user input device, such as a game controller and a trigger travel distance adjustment mechanism. The user input device includes a finger depressible trigger button, a trigger travel path adjustment assembly that resides in an internal cavity of a housing of the user input device, and a finger switch configured to be switched between a plurality of selectable positions in real-time. A first selectable position of the finger switch causes the adjustment assembly to enable the trigger button to be depressed a first distance. A second selectable position of the finger switch causes the adjustment assembly to enable the trigger button to be depressed a second distance that is greater than the first distance.

Further features and advantages of various embodiments of the disclosure, as well as the structure and operation of various embodiments of the disclosure, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figures 1A, 1B:
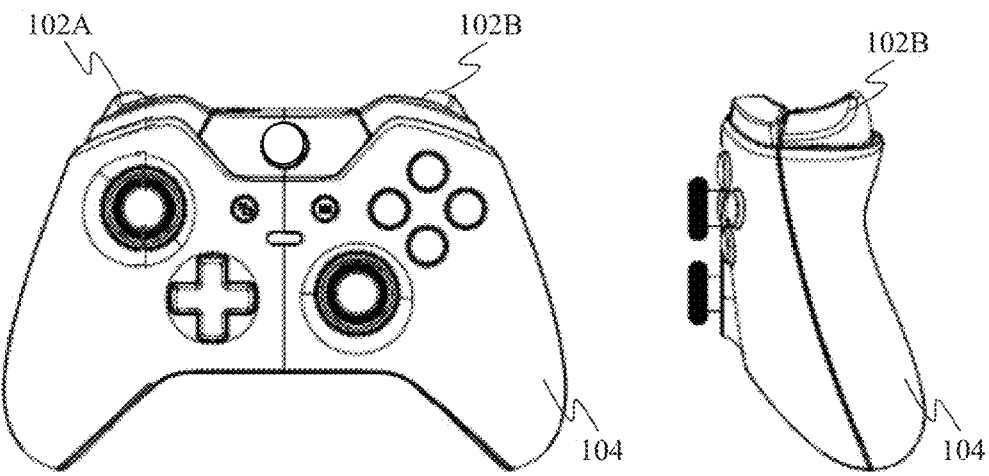
FIGS. 1A and 1B show front and side views, respectively, of an example user input device.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II Example Embodiments for a Trigger Travel Stop with On-Demand Switching

User input devices exist that include various buttons, including triggers and/or other input mechanisms. Such user input devices enable users to interact with other devices. For instance, a television remote control enables a user to interact with a television. Another form of remote control device may be used to control an unmanned aircraft (e.g., a drone) or land-based vehicle. A game controller is a type of user input device that is designed to facilitate user interaction with a video game or other application executing on a computer, video game console, or other platform. For example, a game controller may provide a means by which a user can control a character or object within a video game. A variety of different types of game controllers exist and each game controller type may include one or more user-actuatable control elements via which a user can provide input. For example, a conventional game controller that is designed to be held in two hands (sometimes referred to as a "gamepad," "control pad," or "joypad") may include one or more user-actuatable buttons, triggers, thumbsticks, directional pads, touch pads, and the like. Each of these control elements may be manipulated by a user to generate various control signals for interacting with a video game.

Some user input devices, such as game controllers, include one or more trigger buttons. For FPS (first person shooter) and similar games, the triggers are often used to fire a weapon simulated on screen. The triggers have a relatively long travel motion, and thus take time to fully depress. However, an initial, partial trigger depression can be used to cause the simulated weapon to fire, without fully depressing the trigger. Video game players ("gamers") who play at a competitive level prefer to be able to fire rounds repeatedly and in quick succession. As such, such gamers tend to partially depress and release the trigger repeatedly to fire more rapidly.

To improve the experience of users of game controllers and other types of user input devices, a physical barrier may be added in the path of the trigger button to shorten trigger travel distance. However, conventional techniques for adding/removing such a barrier require halting of game play to make the adjustment, the use of tools, and in some cases, the controller has to be opened up to effect the adjustment inside.

Accordingly, in embodiments, the travel distance of a trigger of a user input device is enabled to be reduced in real-time. "Real-time" is defined as a time of active use of the user input device, such as actual game play. In the example of a game controller, a gamer may flip a switch to change the travel distance of a trigger button, even while in the midst of game play. The user does not have to set down the user input device to open it, does not have to adjust the user input device with a tool (e.g., a screw driver); the user may make changes to the user input device without even looking at the user input device or otherwise interrupting real-time use. Instead, the user can interact with a button or a switch or other user interface mechanism of the user input device to change the travel distance of a trigger button, just as the user does with other real-time interactions with the user input device. Stoppage of use, such as stopping active game play to open or use a tool on the user input device is a loss or interruption of real-time use (which is not something done during real-time interaction), and is not required in embodiments. In this manner, the gamer can have less excess trigger motion during games where the full throw is not necessary to activate a function (such as weapon firing), and can make this change during real-time use. Embodiments may augment the existing trigger buttons of game controllers and other user input devices, such as the Microsoft® Xbox® One controller. In embodiments, a rotating cam part is implemented in the user input device to provide a shorter travel hard stop for the trigger movement. When engaged, this hard stop shortens the trigger travel by any desired amount, such as approximately 50%, while providing a similar 'piano key' feel as the normal (full) stop position.

When engaged, the cam rotates to move the hard stop into the trigger travel path, creating a barrier to the trigger. As such, the trigger instantly goes into the short travel (e.g., "hair trigger"; partial travel path) mode. When the trigger is depressed in this mode, the trigger impacts the cam (e.g., on a foam pad attached to the cam) and cannot travel further. When disengaged, the cam swings the hard stop out of the way of the trigger, and does not interfere with trigger travel. The trigger instantly goes back to the normal travel (long throw; full travel path) mode use and feel for those gamers who desired this mode.

In embodiments, a finger switch (also referred to as "switch button") may be implemented on the user input device, allowing a user to switch between modes in "real time." The switch button can be easily activated by the user's fingertip without releasing or changing grip on the user input device.

The user can switch between partial and full trigger travel modes at any time by moving a button (or other user interface control mechanism) back and forth in real-time. In an embodiment, a switch button is spring loaded with an over-center feature to provide a self-stabilizing feature. For instance, if the switch button is moved by the user only partway, the spring causes the travel distance to flip over into one of the full travel path or partial travel path states in a crisp motion. As such, in-between states are not stable.

A user input device may include one or more triggers, and each trigger may be configured with the full mode and one or more partial travel path modes, as desired.

Accordingly, an embodiment may enable a solid, durable, hard stop position that significantly reduces the physical motion of the trigger, while maintaining the original soft-stop feel. The user is able to switch between short travel and normal motion instantly during gameplay, without tools or disassembly. The switching mechanism provides clear tactile feedback and self-stabilizes at the two (or more) states. This prevents half-way motion and eliminates uncertainty. The switch button is located within easy reach of the user without requiring the user to change grip or look down at the user input device. An internal geometry is shaped to prevent lockup of the trigger, which can be a side effect of adding parts within the user input device.

Embodiments are applicable to all types of user input devices that include one or more triggers. For instance, FIGS. 1A and 1B show front and side views, respectively, of an example game controller 100 that includes a first trigger button 102A and a second trigger button 102B (only second trigger button 102B is visible in FIG. 1B). Game controller 100 is an example user input device, which is provided for purposes of illustration, and is not intended to be limiting. User input devices to which embodiments apply may have different shapes, different sizes, different numbers and/or placements of user interface features (e.g., buttons, knobs, switches, triggers, pads, sticks), and/or other differences from game controller 100 shown in FIGS. 1A and 1B. Trigger-related functionality of game controller 100 is described as follows.

Trigger buttons 102A and 102B are each a trigger button that can be depressed by a finger of a user. In the current example, trigger buttons 102A and 102B are configured to tilt or pivot, when depressed, at a hinge at an end of the trigger button. In FIGS. 1A and 1B, the hinge/pivot is internal to a housing 104 of game controller 100, and is thus not visible (example hinge/pivot is visible in other figures). In other embodiments, other trigger movement enabling mechanisms may be used.

In FIGS. 1A and 1B, trigger buttons 102A and 102B are shown in the non-depressed position. When depressed (e.g., pushed or squeezed) by a finger of a user, trigger buttons 102A and 102B are pivoted towards the inside of housing 104 of game controller 100. Depressing one or more trigger buttons 102A and 102B may cause an action to be performed (e.g., selection of a television channel, firing a weapon within a game being played by the user, a particular motion of a character (e.g., jumping, sprinting) in a game being played by the user, and/or other out-of-game or in-game actions).

Trigger buttons 102A and 102B of a conventional version of game controller 100 have two positions: non-depressed (as in FIGS. 1A and 1B) and fully depressed. According to embodiments disclosed herein, trigger buttons 102A and 102B may be provided with one or more additional positions when depressed by a user, such as being 50% depressed or any other non-fully depressed position.

Trigger buttons 102A and 102B can each be formed as a single piece or can be assemblies of multiple pieces. Trigger buttons 102A and 102B may be manufactured from any suitable material(s), including plastic (e.g., injection molded), metal or a combination of metals/alloys, etc. Housing 104 can be formed as a single piece or by two more interlocking pieces (e.g., top and bottom portions). Housing 104 may be made from any suitable material(s), including plastic (e.g., injection molded), metal or combination of metals/alloys, etc.

Figure 2A:
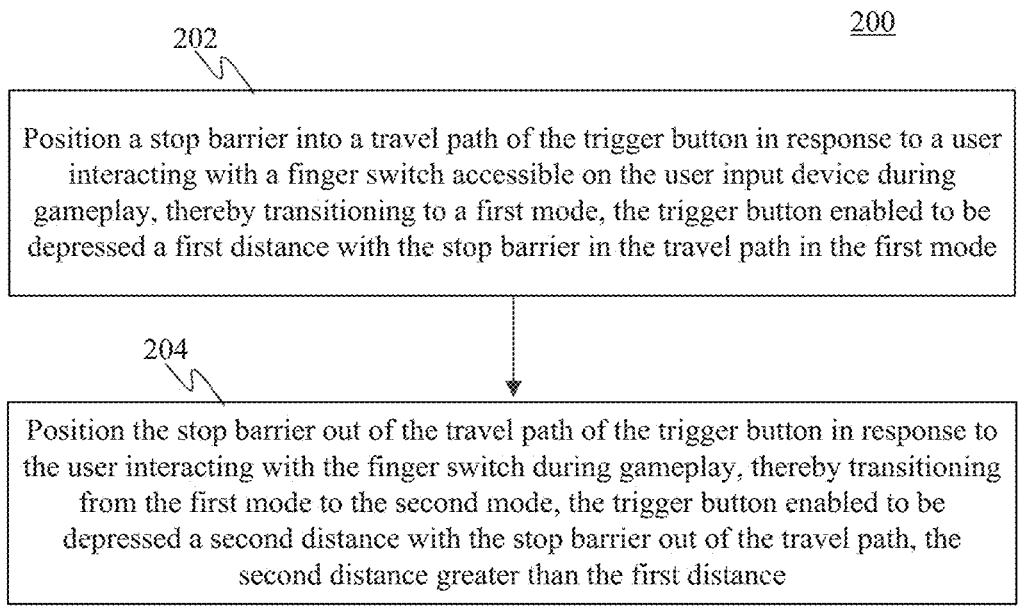
FIG. 2A shows a flowchart providing a process for real-time adjustment of a travel distance of a user input device trigger button, according to an example embodiment.

Embodiments can operate in various ways to enable adjustment of the trigger travel distance between full travel and one or more partial travel modes. For example, FIG. 2A shows a flowchart 200 providing a process for real-time adjustment of a travel distance of a user input device trigger button, according to an example embodiment. The user input devices described herein, such as game controller 100, may be configured to operate according to flowchart 200, in embodiments. Further structural and operational embodiments will be apparent to persons skilled in the relevant art(s) based on the following description of flowchart 200.

Flowchart 200 begins with step 202. In step 202, a stop barrier is positioned into a travel path of the trigger button in response to a user interacting with a finger switch accessible on the user input device during gameplay, thereby transitioning to a first mode. The trigger button is enabled to be depressed a first distance with the stop barrier in the travel path in the first mode. In an embodiment, when a user interacts with a finger switch (e.g., presses the switch or slides the switch in a first direction) accessible on the user input device, such as game controller 100 of FIGS. 1A and 1B, a stop barrier may be positioned (internal to the user input device housing) in the travel path of the corresponding trigger button (e.g., first trigger button 102A or second trigger button 102B). The stop barrier is positioned to restrict the trigger button to being able to be depressed a shorter distance in the first mode, relative to when the stop barrier is not in the travel path of the trigger button in the second mode.

In step 204, the stop barrier is positioned out of the travel path of the trigger button in response to the user interacting with the finger switch during gameplay, thereby transitioning from the first mode to the second mode. The trigger button is enabled to be depressed a second distance with the stop barrier out of the travel path, the second distance being greater than the first distance. In an embodiment, when a user interacts with the finger switch (e.g., presses the switch, slides the switch in a second direction) accessible on the user input device, the stop barrier may be re-positioned (internal to the user input device housing) to be out of the travel path of the corresponding trigger button. The stop barrier is positioned to allow the trigger button to be able to be depressed its full available distance in the second mode, in contrast to the partial distance available when the stop barrier is positioned in the travel path of the trigger button in the first mode.

Furthermore, as described above, a trigger button may be configured with a self-stabilization feature. According to this feature, when the switch button is not fully moved into the appropriate positions for the first and second modes, such as being set in an intermediate switch position between the switch positions for the first and second modes, the trigger button (and switch button) is configured to automatically transition into either the full travel path configuration or the partial travel path configuration.

Figure 2B:
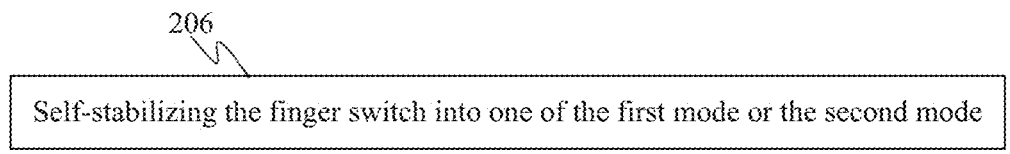
FIG. 2B shows a process for real-time stabilizing of the adjustable travel distance of a user input device trigger button, according to an example embodiment.

For instance, FIG. 2B shows a step 206 for real-time stabilizing of the adjustable travel distance of a user input device finger switch, according to an example embodiment. In step 206, the finger switch is self-stabilized into one of the first mode or the second mode. In an embodiment, a finger switch or button (e.g., finger switch 308a or 308B) may be configured with a spring or other stabilization mechanism that automatically forces the finger switch into the partial travel path or full travel path configuration.

User input devices can be configured in various ways to perform the processes of FIGS. 2A and 2B. Various example embodiments for user input devices configured with adjustable trigger travel distances and self-stabilization features are described in the following subsections. These example embodiments are provided for purposes and are not intended to be limiting. Furthermore, the embodiments described herein may be combined in any manner, such as making any combination of trigger adjustment mechanism with any type of self-stabilization.

Figure 3:
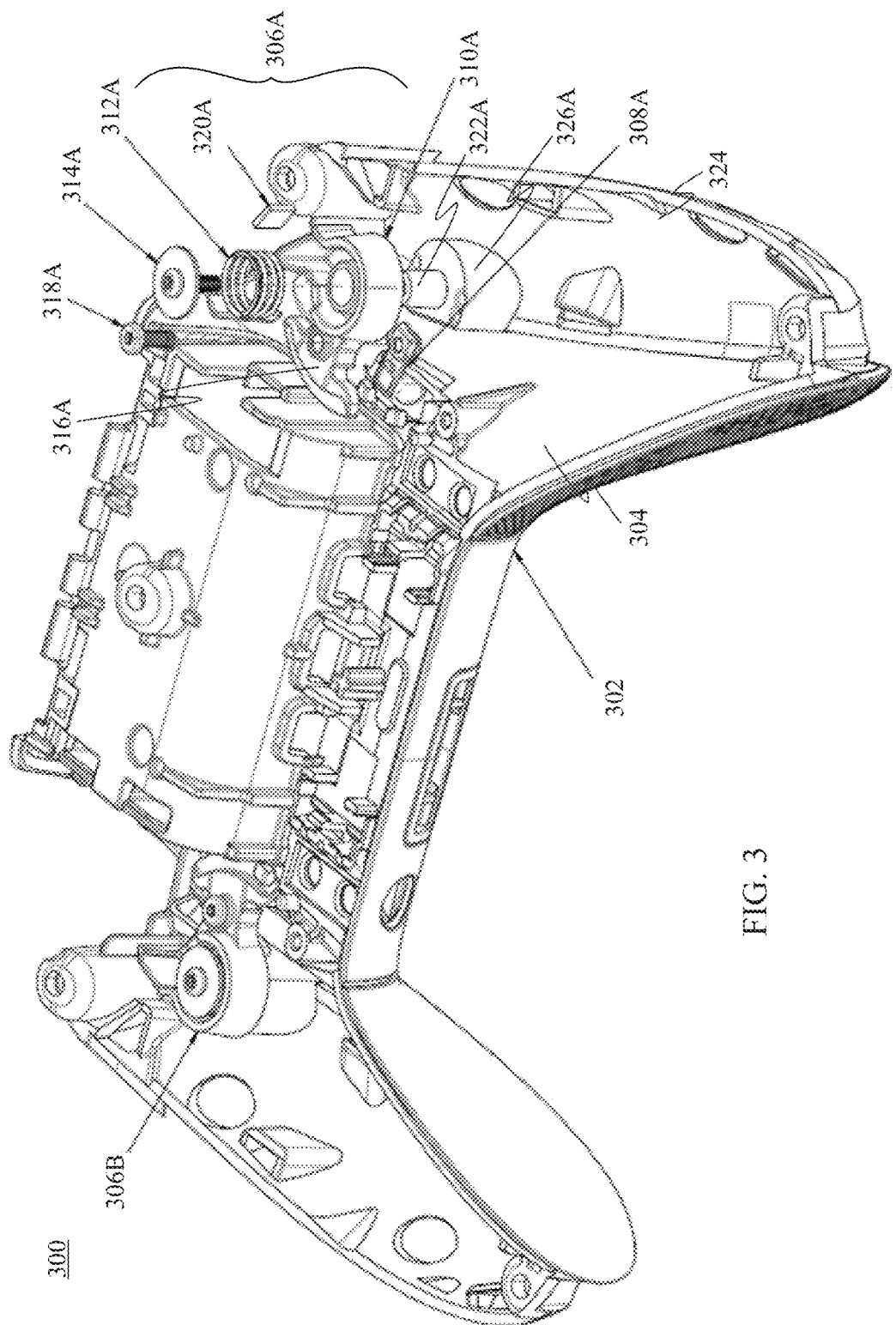
FIG. 3 shows a perspective diagram of a user input device with non-exploded and exploded views of interior assemblies for adjusting travel distance of trigger buttons based on bottom side control switches, according to an example embodiment.

A. Example Embodiments for a Trigger Travel Stop Actuated with Bottom Switch As described above, user input devices can be configured in various ways to enable adjustment of trigger travel distance. For instance, FIG. 3 shows a perspective diagram of a user input device 300, according to an example embodiment. User input device 300 includes a case or housing 302 that defines an internal cavity 304 for internal components of user input device 300. In FIG. 3, a bottom portion of housing 302 is shown, while a top portion of housing 302 is not shown for ease of illustration (user input device 100 of FIGS. 1A and 1B is shown with top and bottom housing portions present). Furthermore, some features of user input device 300 that are shown in FIG. 3 are not described for purposes of brevity, and user input device 300 may include further features not shown in FIG. 3. Still further, user input device 300 includes first and second finger depressible trigger buttons (similar to trigger buttons 102A and 102B of FIGS. 1A and 1B), which are not shown in FIG. 3 for ease of illustration.

As shown in FIG. 3, user input device 300 includes first and second trigger travel path adjustment assemblies 306A and 306B that reside in cavity 304, and correspond to the two trigger buttons. Adjustment assembly 306A is shown in exploded form, while adjustment assembly 306B is shown in non-exploded (assembled/operational) form. Furthermore, user input device 300 includes first and second finger switches. A first finger switch 308A (back side) is shown in FIG. 3 corresponding to adjustment assembly 306A, while a second finger switch corresponding to adjustment assembly 306B is not visible in FIG. 3. Each finger switch is configured to be switched between first and second selectable positions in real-time. A first selectable position of a finger switch causes the corresponding one of adjustment assemblies 306A and 306B to enable the associated trigger button to be depressed a first distance (first mode; partial travel distance mode). A second selectable position of the finger switch causes the corresponding one of adjustment assemblies 306A and 306B to enable the associated trigger button to be depressed a second distance that is greater than the first distance (second mode; full travel distance mode).

In the example of FIG. 3, adjustment assemblies 306A and 306B are mirror images of each other, and have generally the same functionality. Adjustment assembly 306A is described as follows as being representative of both of adjustment assemblies 306A and 306B.

As shown in FIG. 3, adjustment assembly 306A includes a cam 310A, a compression spring 312A, a cap 314A, a slot cover 316A, an elongated connection member 318A, and an optional foam pad 320A. Cam 310A may be made from any suitable material, such as a plastic (e.g., Dupont™ Delrin®) (e.g., by injection molding), a resin, a metal, etc. Cam 310A is a component that is rotated by a user interacting with finger switch 308A (at the bottom side of housing 302). Moving finger switch 308A into the first selectable position rotates cam 310A such that the associated trigger button is placed in partial travel mode. Moving finger switch 308A into the second selectable position rotates cam 310A such that the associated trigger button is placed in full travel mode.

Figure 4:
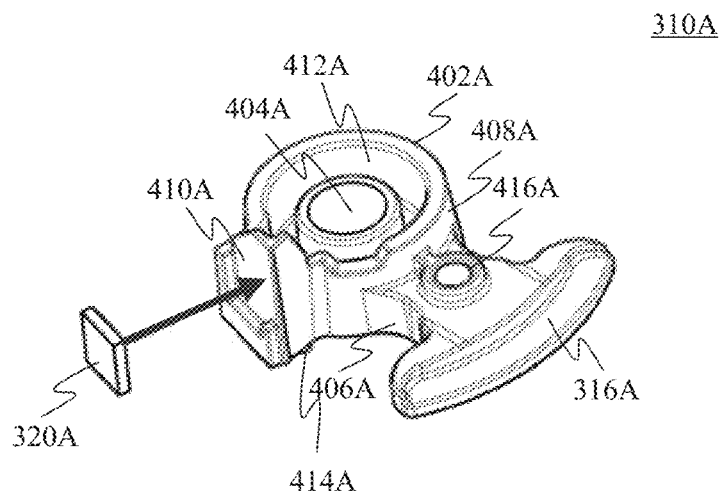
FIG. 4 shows a perspective view of a cam configured to enable real-time adjustment of trigger path travel distance, according to an example embodiment.

Cam 310A may be configured in various ways to perform its functions. For instance, FIG. 4 shows a perspective view of cam 310A, according to an example embodiment. As shown in FIG. 4, cam 310A is defined by a body 402A, a central cylindrical opening 404A in body 402A, an arm 406A, a cylindrical outer surface 408A of body 402A, a stop barrier 410A, a cylindrical recess 412A in body 402A that surrounds opening 404A, and a tab 414A.

Figure 5:
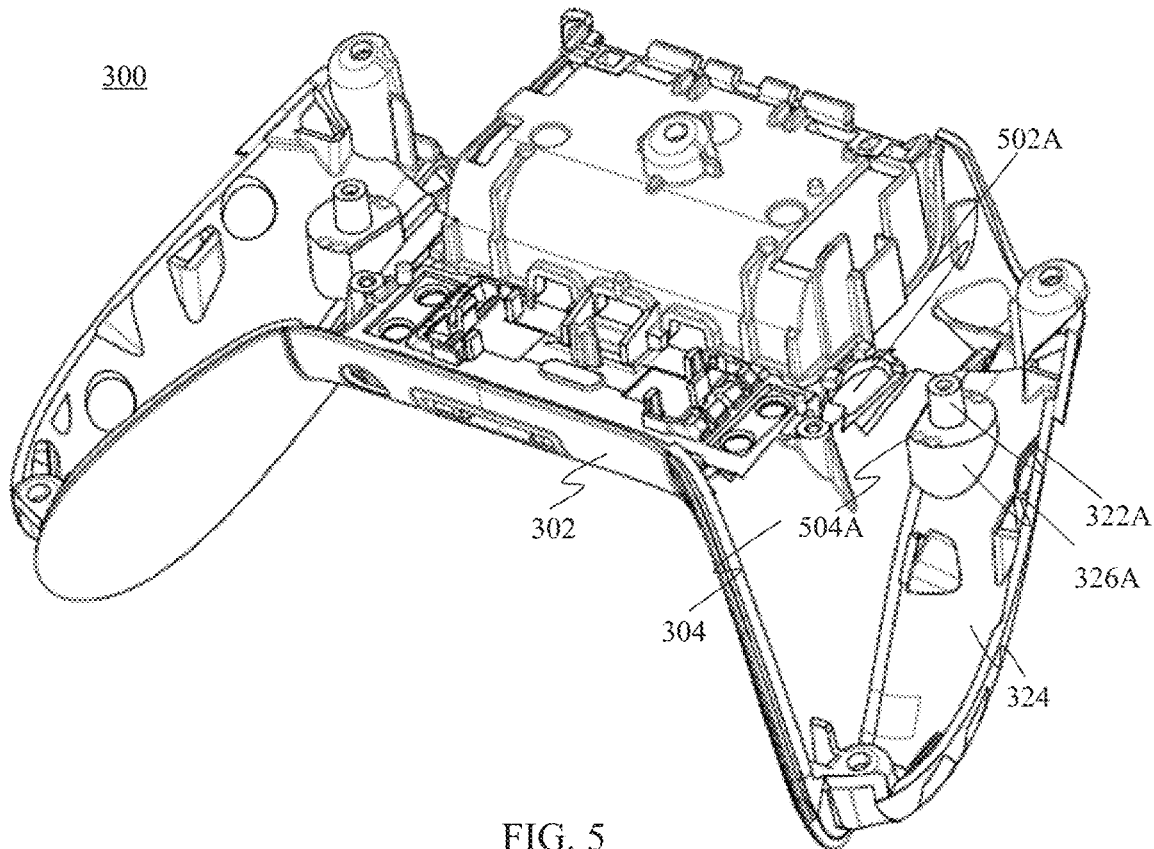
FIG. 5 shows a perspective diagram of the user input device of FIG. 3, with the interior assemblies for adjusting travel distance of trigger buttons not present, according to an example embodiment.

Central cylindrical opening 404A in body 402A is configured to receive a post 322A (see FIG. 3) extending from an inner surface 324 of housing 302. When fitted on post 322A, cam 310A is configured to be rotatable at least partially around post 322A. For example, FIG. 5 shows a perspective diagram of user input device 300 of FIG. 3, with adjustment assemblies 306A and 306B not present for ease of illustration, according to an example embodiment. As shown in FIG. 5, post 322A extends from a base 326A that extends from inner surface 324 of housing 302, though in other embodiments, base 326A need not be present.

Arm 406A extends from cylindrical outer surface 408A of body 402A to be coupled to the finger switch (e.g., finger switch 308A shown in FIG. 3). By being coupled to the finger switch, arm 406A rotates cam 310A with the movement of the finger switch.

Stop barrier 410A extends from cylindrical outer surface 408A of body 402A. Stop barrier 410A is a barrier that is rotated in and out of a travel path of the trigger button, when cam 310A rotates, to reduce or not reduce the travel distance of the trigger button when depressed. Stop barrier 410A can have any suitable shape. For instance, from a top view of cam 310A (e.g., viewing cam downward in FIG. 4 along an axis through central cylindrical opening 404A), stop barrier 410A may be triangular in shape. Stop barrier 410A may have a rectangular or other shape surface that receives the backside of the trigger button. Furthermore, the surface of stop barrier 410A that receives the backside of the trigger button may be made of, or may have a compressible material mounted thereto. For instance, as shown in FIGS. 3 and 4, foam pad 320A may be attached to the surface of stop barrier 410A that receives the backside of the trigger button, to cushion the impact. Foam pad 320A contains a foam material (that provides cushion); the foam pad 320A may be rectangular or another shape and may have an adhesive material (e.g., a pressure sensitive adhesive) on a surface of foam pad 320A that is used to attach foam pad 320A to stop barrier 410A (e.g., by removing an adhesive liner from a surface of foam pad 320A to expose the adhesive material, and pressing the surfaces together). In another embodiment, a compressible spring may be used in place of foam pad 320A, or another compressible material.

Furthermore, different compressible materials may be used at different stop barriers of a cam to enable varied trigger button feel. For instance, a first compressible material having a first compression resistance (e.g., a thin foam pad or open cell foam; relatively low compression resistance, lightly dampens feel) may be used at a first stop barrier corresponding to a first selectable position of a finger switch, and a second compressible material having a second compression resistance (e.g., a thick foam pad; relatively high compression resistance) may be used at a second stop barrier corresponding to a second selectable position of the finger switch. If the finger switch is moved to the first selectable position, the thin foam pad (or open cell foam) is moved into the trigger travel path, and a relatively low activation force over the travel path of the trigger is caused (concentrated at the end of the travel path for the thin foam pad). If the finger switch is moved to the second selectable position, the thick foam pad is moved into the trigger travel path, and an increased activation force over the travel of the trigger is caused, which becomes harder/firmer the further that the trigger is pressed. Further materials, additionally or alternatively to foam pads, such as a compression spring, may be moved into the trigger travel path to cause a decrease or increase in activation force for a trigger button over its travel path/distance.

Referring back to FIGS. 3-5, the trigger button may have a finger receiving surface and a backside opposed to the finger receiving surface. Switching the finger switch into the first selectable position causes stop barrier 410A to be rotated into the travel path of the trigger button (step 202 of flowchart 200 in FIG. 2A). In this configuration, the trigger backside is received by stop barrier 410A when the trigger button is depressed, which limits movement of the trigger button to the first (shortened) distance. Switching the finger switch into the second selectable position causes stop barrier 410A to be rotated out of a travel path of the trigger button (step 204 of flowchart 200 in FIG. 2A). In this configuration, the back side surface of the trigger button does not meet stop barrier 410A when depressed (e.g., by a finger pressing on the finger receiving surface of the trigger button). Therefore, the trigger button movement is not reduced.

Furthermore, slot cover 316A may be a separate piece from cam 310A, as shown in FIGS. 3 and 4, or slot cover 316A and cam 310A may be single unitary piece, where slot cover 316A extends from an end of arm 406A. When separate from each other, slot cover 316A and arm 406A may be connected together in various ways.

For instance, as shown in FIGS. 3 and 4, elongated connection member 318A (e.g., a bolt, a screw) may be present to connect together slot cover 316A, arm 406A (through opening 416A in slot cover 316A and arm 406A), and the finger switch. The finger switch may have a first portion extending outside of housing 302 through a slot 502A (shown in FIG. 5) in housing 302 and a second portion inside housing 302 to which elongated connection member 318A connects (e.g., an opening in the finger switch that member 318A screws into). Slot cover 316A is configured to rotate around post 322A with arm 406A to cover an open portion of slot 502A in the first and second selectable positions of the finger switch.

Figure 6:
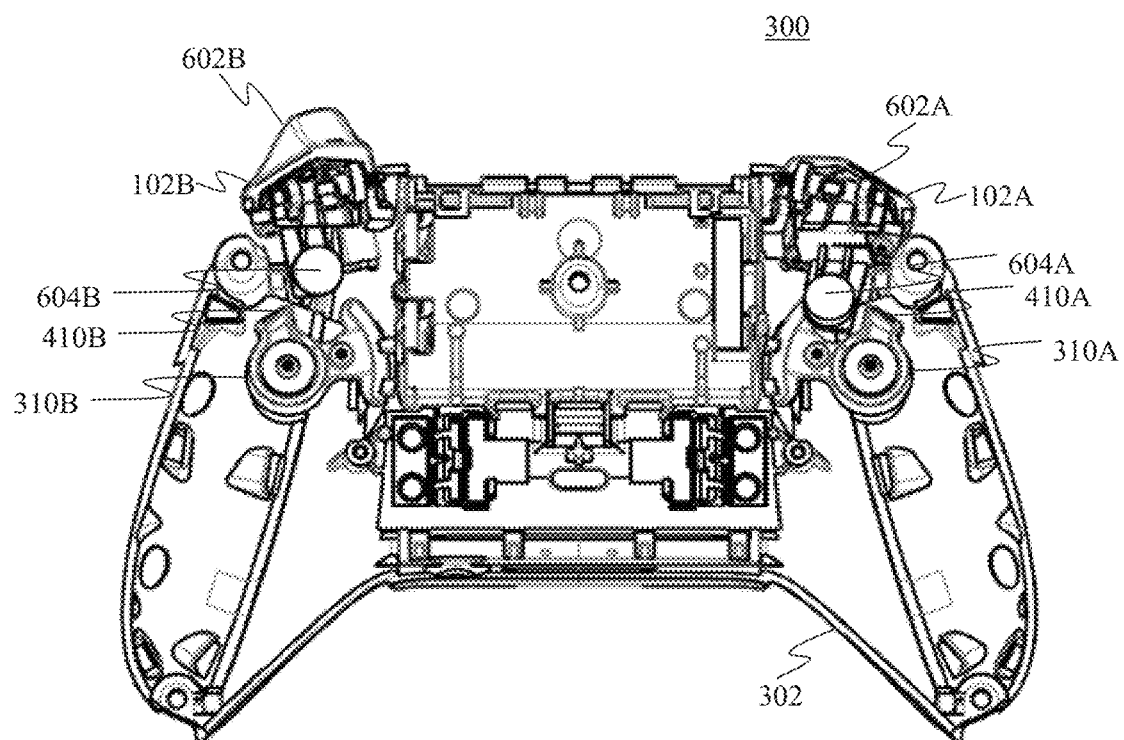
FIG. 6 shows a top view of the user input device of FIG. 3 with triggers in the full travel mode, according to an example embodiment.
Figure 7:
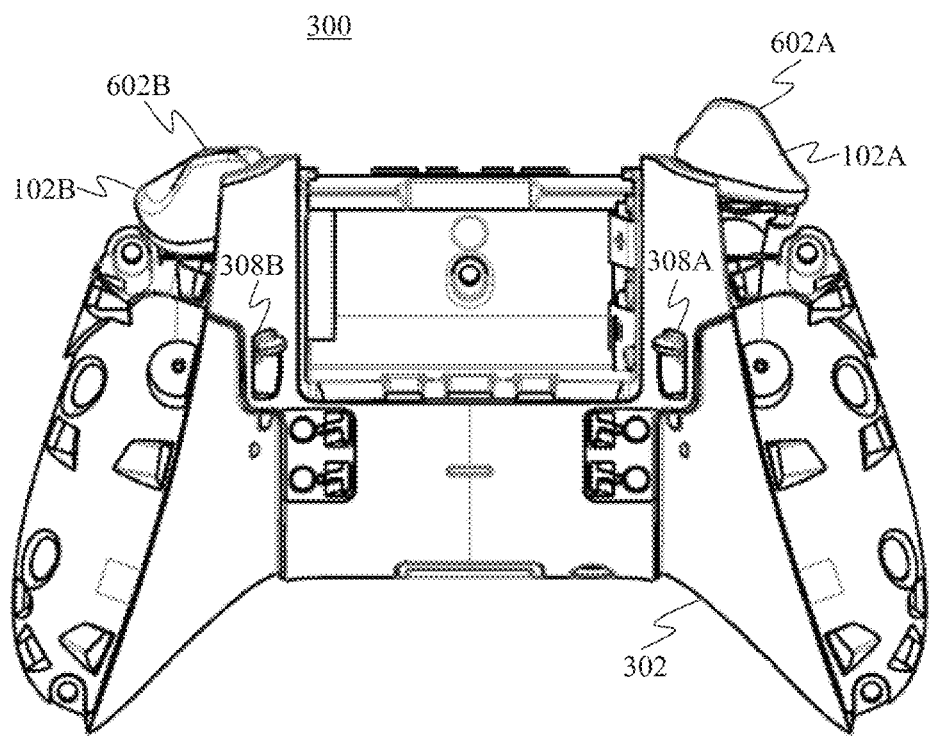
FIG. 7 shows a bottom view of the user input device of FIG. 6, showing bottom side control switches in the off (full travel mode) position, according to an example embodiment.
Figure 8:
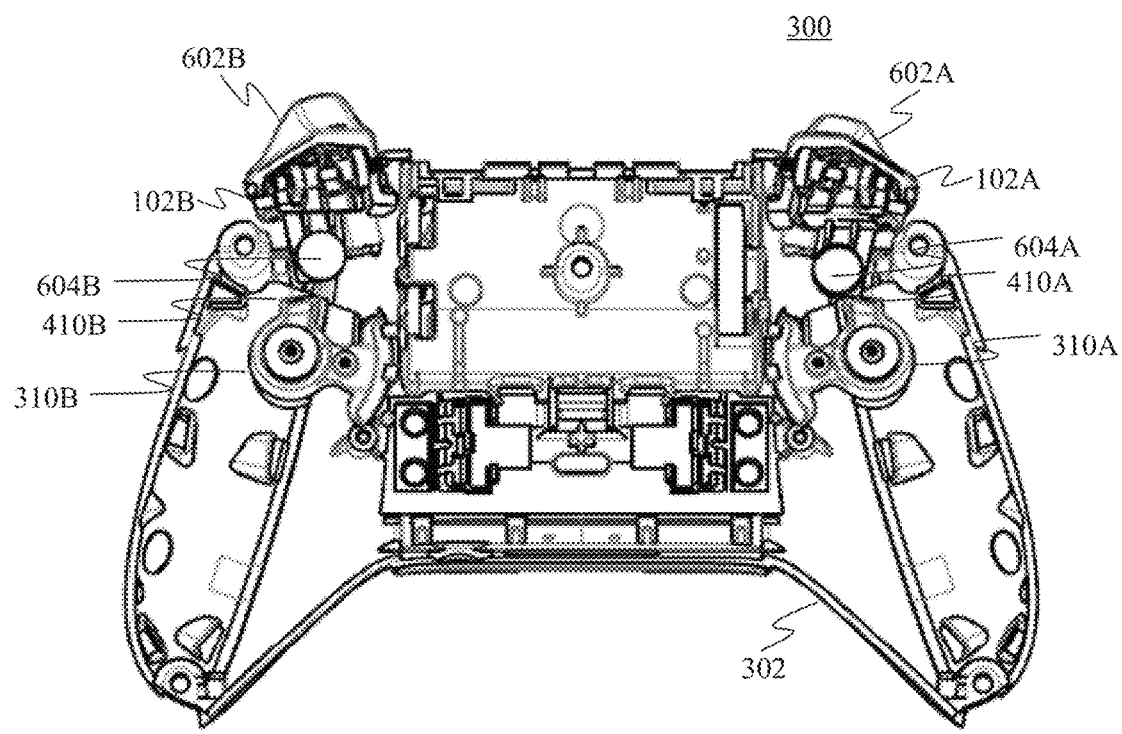
FIG. 8 shows a top view of the user input device of FIG. 3 with triggers in the partial travel mode, according to an example embodiment.
Figure 9:
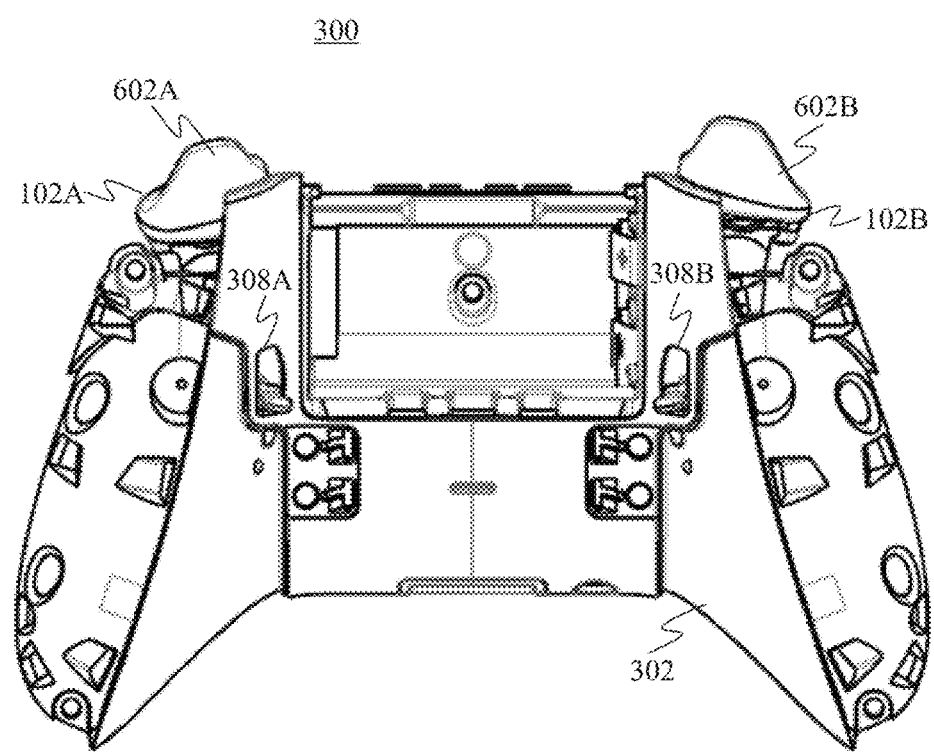
FIG. 9 shows a bottom view of the user input device of FIG. 8, showing bottom side control switches in the on (partial travel mode) position, according to an example embodiment.

For example, FIGS. 6-9 show views of user input device 300, illustrating operation of adjustable trigger travel distance. User input device 300 of FIGS. 6-9 includes trigger buttons 102A and 102B. FIGS. 6 and 7 show top and bottom views, respectively, of user input device 300 with trigger buttons 102A and 102B in the full travel mode, according to an example embodiment. Furthermore, FIGS. 8 and 9 show top and bottom views, respectively, of user input device 300 with trigger buttons 102A and 102B in the partial travel mode, according to an example embodiment. In FIGS. 7-10, housing 302 is partially shown. FIGS. 6-9 are described as follows.

As shown in FIGS. 6 and 8, trigger button 102A has a finger receiving surface 602A and a backside 604A that is opposed to finger receiving surface 602A. Likewise, trigger button 102B has a finger receiving surface 602B and a backside 604B. Finger receiving surface 602B is a surface where a finger of a user can press to apply pressure to trigger button 102A. The pressure causes trigger button 102A to move (e.g., be depressed, pivot) and be activated. Electrical circuitry (e.g., processing logic, a processor circuit that executes program code, electrical circuit components) of a user input device registers the movement of trigger button 102A, and as a result, a real-time action can be performed (e.g., virtual gun firing, in-game character action, a selection of content). Note that as shown in FIGS. 6 and 8, backside 604A of trigger button 102A may include one more features/protrusions (e.g., the round feature shown in FIGS. 6 and 8) that move (e.g., pivot) with the entirety of the movement of trigger button 102A.

Switching finger switch 308A (FIG. 7) into the second selectable position (e.g., in the "up" position in FIG. 7) causes stop barrier 410A of cam 310A (associated with trigger button 102A) to be rotated out of a travel path of backside 604A of trigger button 102A. This is because, with respect to FIGS. 3, 4, and 6, elongated connection member 318A connects finger switch 308A to slot cover 316A and arm 406 of cam 310A. As such, when finger switch 308A is pushed/flipped upward in FIG. 6, arm 406A is rotated in the same direction, thereby rotating cam 310A around its axis (clockwise in FIG. 6), rotating slot cover 316A in the same direction (to keep slot 502A covered), and rotating stop barrier 410A out of the travel path. Similarly, switching finger switch 308B (FIG. 7) into the second selectable position (e.g., in the "up" position in FIG. 7), causes stop barrier 410B of cam 310B (associated with trigger button 102B) to be rotated (counterclockwise in FIG. 6) out of a travel path of backside 604B of trigger button 102B.

Accordingly, in this configuration, the trigger button backsides do not meet a stop barrier when depressed (e.g., by a finger pressing on finger receiving surface 602A or 602B) of the corresponding trigger button. For instance, in FIGS. 6 and 7, trigger button 102A is shown depressed (trigger button 102B is not pressed). As shown in FIG. 6, because stop barrier 410A is rotated out of the way, trigger button backside 604A does not collide into stop barrier 410A with trigger button 102A fully depressed. Therefore, the movement of trigger button 102A is not reduced in FIGS. 6 and 7.

Figure 10:
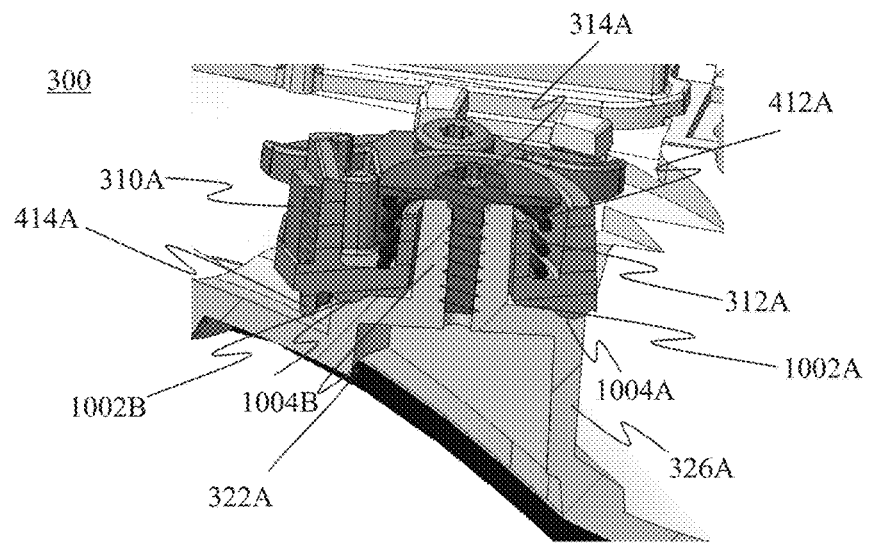
FIGS. 10-12 shows cross-sectional views of an assembly for adjusting travel distance of a trigger button, each with a different cam position to illustrate self-stabilization, according to an example embodiment.

With regard to FIGS. 9 and 10, switching finger switch 308A (FIG. 9) into the first selectable position (e.g., in the "down" position in FIG. 7) causes stop barrier 410A of cam 310A (associated with trigger button 102A) to be rotated into the travel path of backside 604A of trigger button 102A. This is because, with respect to FIGS. 3, 4, and 8, elongated connection member 318A connects finger switch 308A to slot cover 316A and arm 406A of cam 310A. As such, when finger switch 308A is pushed/flipped downward in FIG. 6, arm 406A is rotated in the same direction, thereby rotating cam 310A around its axis (counterclockwise in FIG. 6), rotating slot cover 316A in the same direction (to keep slot 502A covered), and rotating stop barrier 410A into the travel path. Similarly, switching finger switch 308B (FIG. 9) into the first selectable position (e.g., in the "down" position in FIG. 9), causes stop barrier 410B of cam 310B (associated with trigger button 102B) to be rotated (clockwise in FIG. 8) into the travel path of backside 604B of trigger button 102B.

Accordingly, in this configuration, the trigger button backsides do encounter a stop barrier when depressed (e.g., by a finger pressing on finger receiving surface 602A or 602B) of the corresponding trigger button. For instance, in FIGS. 8 and 9, trigger button 102A is shown depressed (trigger button 102B is not pressed). As shown in FIG. 8, because stop barrier 410A is rotated into the travel path, trigger button backside 604A collides with stop barrier 410A when trigger button 102A is depressed, preventing trigger button 102A from being depressed more than 50%. Therefore, the movement of trigger button 102A is reduced in FIGS. 8 and 9. This can be seen by comparing the amount of depression of trigger button 102A in FIG. 6 (fully depressed) and in FIG. 8 (partially depressed).

It is noted that in FIGS. 6-9, cams 310A and 310B and stop barriers 410A and 410B are configured to provide a partial travel distance for trigger buttons 102A and 102B of approximately 50% of the full travel distance. In other embodiments, cams 310A and 310B and stop barriers 410A and 401B can be configured to provide other partial travel distances (e.g., 25%, 75%, 15%) for trigger buttons 102A and 102B. For example, stop barrier 410A may be provided with a longer radial length (from a center of cam 310A) to enable a shorter travel distance for trigger button 102A, or can be provided with a shorter radial length to enable a longer travel distance for trigger button 102A.

As shown in FIG. 4, tab 414A may be present on a (second outer) bottom surface of cam 310A. Tab 414A is configured to prevent over-rotation of cam 310A. Tab 414A protrudes/extends from the bottom surface of cam 310A towards inner surface 324 of housing 302, and may be curved (e.g., curving partially around opening 404A). When present, Tab 414A is configured to contact a planar side surface of base 326A when cam 310A is rotated a particular predetermined amount, in either direction. In this manner, adjustment assembly 306A is protected from over-rotation (e.g., when a user mashes trigger button 102A).

As described above, a trigger button with adjustable stop distance may be configured for self-stabilization. If a switch button is moved by the user only partway between partial and full trigger travel modes, embodiments are configured to self-stabilize into one of the modes. For instance, a spring may cause the travel distance to flip over into one of the full travel path or partial travel path states. In this manner, in-between states are not stable.

With respect to user input device 300 of FIGS. 3-9, compression spring 312A is configured as a detent mechanism to provide self-stabilization for adjustment assembly 306A. Compression spring 312A (and further springs disclosed herein) can be made from any suitable material, including a metal or combination of metals/alloy, a composite material, etc. As shown in FIGS. 3 and 4, spring 312A is configured to reside in cylindrical recess 412A in body 402A. Cap 314A (e.g., a screw as in FIG. 3, a retaining ring) is configured to hold and at least partially compress spring 312A in cylindrical recess 412A by attaching into (e.g., screwing into) post 322A. Furthermore, a bottom surface of cam body 402A has one or more mating features (e.g., bumps or recesses) that are configured to mate with corresponding mating features on a surface of base 326A. The mating feature(s) on the bottom surface of body 402A are configured to mate with the corresponding mating features on a surface of base 326 when cam 310A is positioned in the first selectable position or the second selectable position, but not in between these positions. Accordingly, when cam 310A is rotated between the first and selectable positions, spring 312A is configured to apply an expansive force between cap 314A and a bottom of cylindrical recess 412A in cam body 402A. Because cap 314A is attached to post 322A, cap 314A cannot move upward, so the force applied by spring 312A onto the bottom of cylindrical recess 412A forces cam body 402A downward, forcing the mating feature(s) on the bottom of cam body 402A into corresponding mating features on the surface of base 326A, rotating cam 310A into one of the first or second selectable positions.

For instance, FIG. 5 shows a set of mating features 504A on a top surface of base 326A. In the example of FIG. 5, two pairs of mating features are included in mating features 504A. For each pair of mating features on the top surface of base 326A, there is a corresponding mating feature on the bottom surface of cam body 402A. In the first selectable position, each mating feature on the bottom surface of cam body 402A resides in a first mating feature of the corresponding pair on the top surface of base 326A (e.g., the mating feature of the pair to the right), and in the second selectable position, resides in a second mating feature of the corresponding pair on the top surface of base 326A (e.g., the mating feature of the pair to the left).

Figure 11:
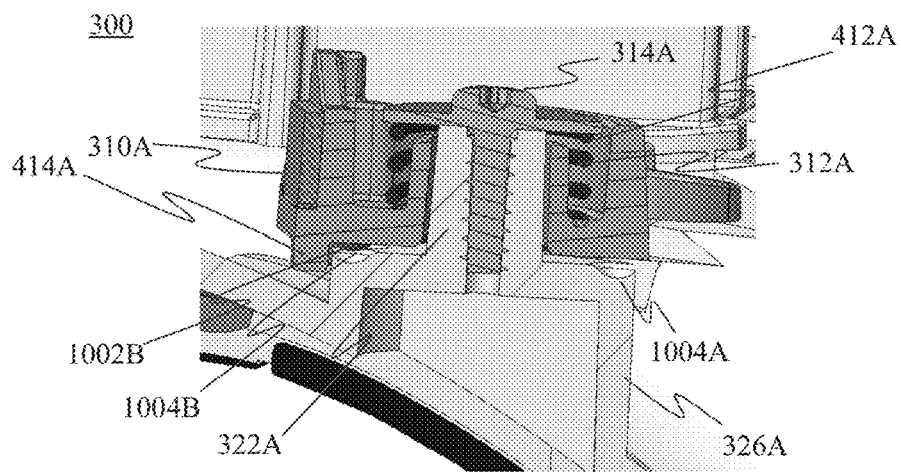
Figure 12:
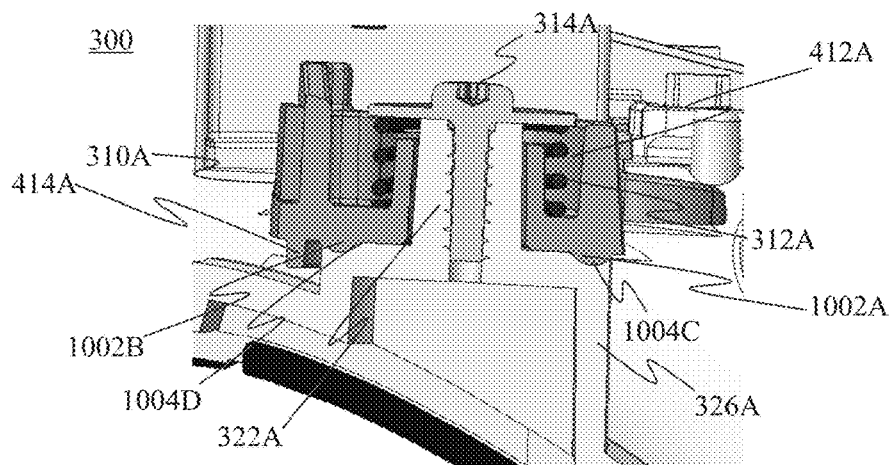

FIGS. 10-12 shows cutaway views of user input device 300, further illustrating the configuration of mating features of FIG. 5 that enable self-stabilization, according to an example embodiment. In particular, FIGS. 10-12 illustrate self-stabilization for an adjustment assembly that includes a cam 310A. As shown in FIGS. 10-12, base 326A extends upward from the housing surface. Post 322A extends upward from a central region of the surface of base 326A. Cam 310A is positioned over post 322A. Cap 314A, which is a screw in FIGS. 10-12, is screwed into a threaded hole in post 322A to hold cam 310A on base 326A. Cam 310A is capable of rotating around post 322A between first and second positions.

In FIG. 10, cam 310A is set in the full travel mode. In other words, a finger switch associated with cam 310A has been switched in the second selectable position, causing cam 310A to be positioned as shown in FIG. 10. A first mating feature 1002A (e.g., a bump) on the bottom of surface of cam 310A resides in a second mating feature 1004A (e.g., a divot) on the top surface of base 326A. Furthermore, a fourth mating feature 1002B (e.g., a bump) on the bottom of surface of cam 310A resides in a fifth mating feature 1004B (e.g., a divot) on the top surface of base 326A. Compression spring 312A in cylindrical recess 412A exerts an expansive force against both the underside of cap 314A and the bottom of recess 412. This expansive force causes first mating feature 1002A to interlock with second mating feature 1004A (e.g. a bump of first mating feature 1002A is pushed into a divot of second mating feature 1004A), and fourth mating feature 1002B to interlock with fifth mating feature 1004B.

In FIG. 11, cam 310A has been moved upwards and rotated slightly, so that first mating feature 1002A (not visible in FIG. 11) no longer mates with second mating feature 1004A, and fourth mating feature 1002B no longer mates with fifth mating feature 1004B. This may be because a user of user input device 300 has slid the finger switch between selectable positions, user input device 300 may have been jarred (e.g., by being dropped), or for another reason. However, compression spring 312A is compressed between cap 314A and recess 412A even further in this position, and thus exerts a greater force between the underside of cap 314A and the bottom of recess 412A. This greater force causes cam 310A to rotate, forcing first mating feature 1002A and fourth mating feature 1002B to mate with the closest mating features on the top surface of base 326A (e.g., with which they overlap).

In FIG. 12, cam 310A is set in the partial travel mode. For example, the finger switch associated with cam 310A may have been switched into the first selectable position, causing cam 310A to be positioned as shown in FIG. 12. Alternatively, and following the example of FIGS. 10 and 11, due to the expansive force of compression spring 312A, cam 310A may have been forced into rotating such that first mating feature 1002A on the bottom of the surface of cam 310A mates with a third mating feature 1004C (e.g., a divot) on the top surface of base 326A, and fourth mating feature 1002B on the bottom of the surface of cam 310A mates with a sixth mating feature 1004D (e.g., a divot) on the top surface of base 326A. Referring to FIG. 5, second and third mating features 1004A and 1002C form a first mating feature pair, and fifth and sixth mating features 1004B and 1002D form a second mating feature pair.

Accordingly, due to the force applied by compression spring 312A, cam 310A rotates to mate first mating feature 1002A with one of second and third mating features 1004A and 1004C, and correspondingly mate fourth mating feature 1002B with one of fifth and sixth mating features 1004B and 1004D. In this manner, the trigger travel path adjustment assembly is self-stabilized into one of the first and second selectable positions.

Note that any of the mating features described throughout the present disclosure may be concave (e.g., a divot, a notch, a hole) or convex (e.g., a bump, a tab), with each mating feature having a shape configured to conform with (be complimentary to) the shape of the mating feature with which it mates.

Figure 13:
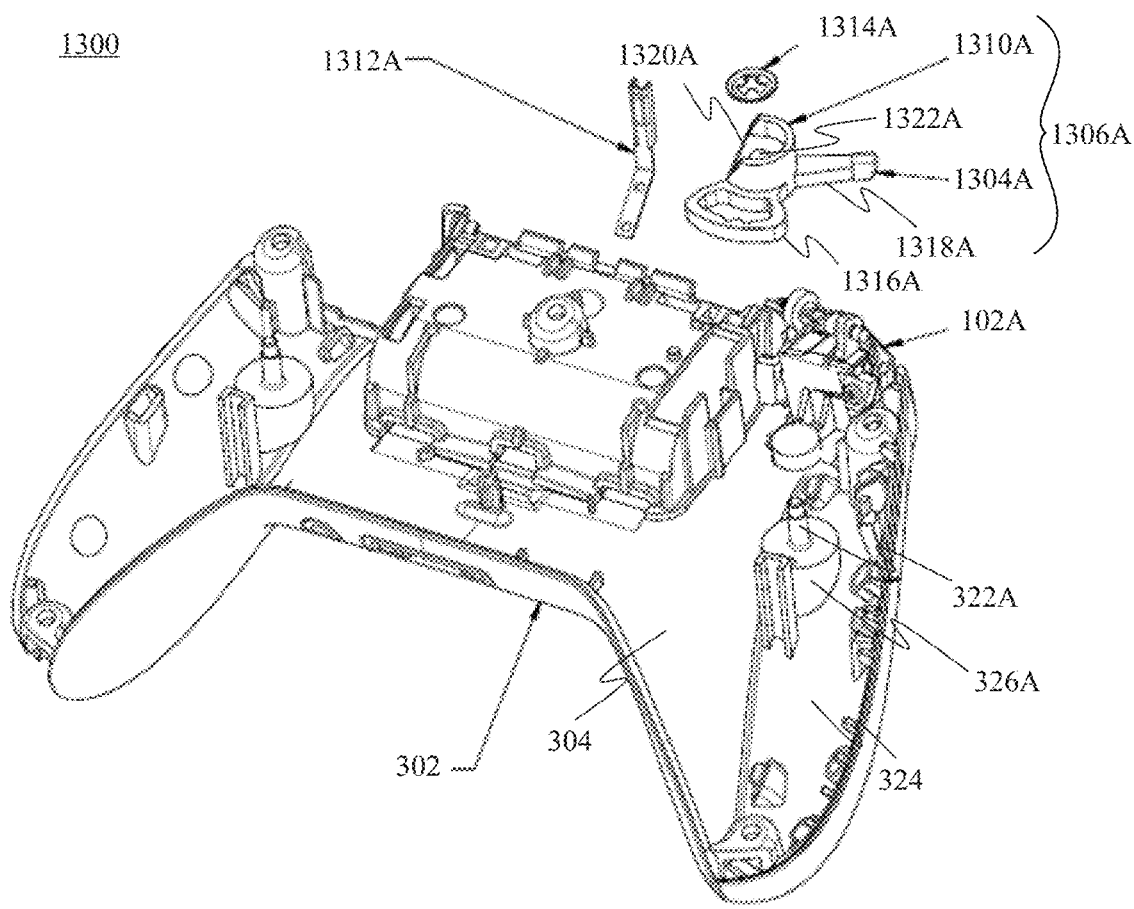
FIG. 13 shows a perspective diagram of a user input device with an exploded view of an interior assembly for adjusting travel distance of a trigger button with a side control switch, according to an example embodiment.
Figure 14:
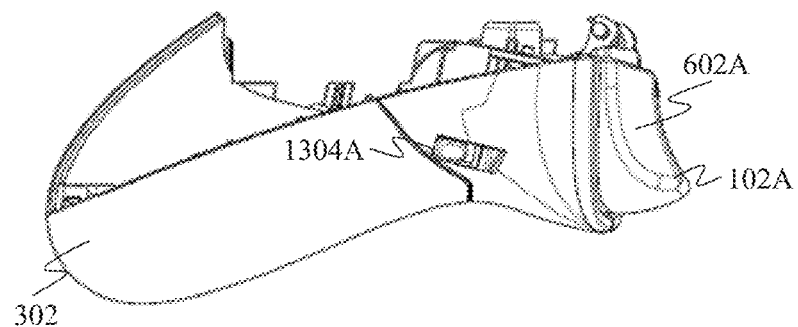
FIG. 14 shows a side view of the user input device of FIG. 13, illustrating the side control switch on a side of the housing, according to an example embodiment.

B. Example Embodiments for a Trigger Travel Stop with Leaf Spring and Actuated with Side Switch FIG. 13 shows a perspective diagram of a user input device 1300, according to another example embodiment. FIG. 13 provides an exploded view of a trigger travel path adjustment assembly 1306A in user input device 1300 that is controlled with a side control switch. FIG. 14 shows a side view of user input device 1300, illustrating side control switch 1304A corresponding to trigger button 102A, according to an example embodiment. Adjustment assembly 1306A and user input device 1300 are described as follows.

Similar to user input device 300 of FIG. 3, user input device 1300 includes a case or housing 302 that defines an internal cavity 304 for internal components of user input device 1300. In FIGS. 13 and 14, a bottom portion of housing 302 is shown, while a top portion of housing 302 is not shown for ease of illustration. Some features of user input device 1300 that are shown in FIG. 13 are not described for purposes of brevity, and user input device 1300 may include further features not shown in FIG. 13.

As shown in FIG. 13, user input device 1300 includes a first trigger travel path adjustment assembly 1306A that resides in cavity 304, and corresponds to trigger button 102A. A second adjustment assembly for a second trigger is not shown in FIG. 13, but may be present in embodiments. Adjustment assembly 1306A is shown in exploded form. Finger switch 1304A is configured to be switched between first and second selectable positions in real-time. A first selectable position of finger switch 1304A (e.g., to the left in FIG. 14) causes adjustment assembly 1306A to enable trigger button 102A to be depressed a first distance (first mode; partial travel distance mode). A second selectable position of finger switch 1304A (e.g., to the right in FIG. 14) causes adjustment assembly 1306A to enable trigger button 102A to be depressed a second distance that is greater than the first distance (second mode; full travel distance mode).

As shown in FIG. 13, adjustment assembly 1306A includes a cam 1310A, a leaf spring 1312A, a cap 1314A, and an optional foam pad (not visible in FIGS. 13 and 14). Cam 1310A may be made from any suitable material, such as a, a resin, a metal, etc. Cam 1310A is a component that is rotated by a user interacting with finger switch 1304A on the side of housing 302. Moving finger switch 1304A into the first selectable position rotates cam 1310A such that the associated trigger button is placed in partial travel mode. Moving finger switch 1304A into the second selectable position rotates cam 1310A such that the associated trigger button is placed in full travel mode.

Cam 1310A may be configured in various ways to perform its functions. For instance, as shown in FIG. 13, cam 1310A is defined by a body 1320A, a retainer ring 1316A, a central cylindrical opening 1322A through body 1320A, an arm 1318A, a stop barrier (not visible in FIG. 13), and an optional tab (not visible in FIG. 13; similar to tab 414A described above).

Central cylindrical opening 1322A in body 1320A is configured to receive post 322A extending from inner surface 324 of housing 302. When fitted on post 322A, cam 1310A is configured to be rotatable at least partially around post 322A.

Arm 1318A extends from the outer surface of body 1320A. Arm 1318A is configured to extend out of slot on the side of housing 302. Finger switch 1304A is coupled to an end of arm 1318A outside of the slot. By being coupled to finger switch 1304A, arm 1318A rotates cam 1310A with the movement of finger switch 1304A.

Accordingly, in one embodiment, finger switch 1304A is configured to slide on an outer side surface of housing 302, and finger switch 1304A includes a backside post that extends into housing 302 through the slot to be coupled to the end of arm 1318A. In an alternative embodiment, the end of arm 1318A that extends outside of the slot may be the finger switch, and thus a separate finger switch 1304A (e.g., a slide switch) may not be present.

Leaf spring 1312A has a first end mounted to inner surface 324 of housing 302 (e.g., by one or more screws) and a second end that is free standing in cavity 304 of housing 302. The second end of leaf spring 1312A extends through the opening of retainer ring 1316A, which extends from the outer surface of body 1320A of cam 1310A. A first mating feature is present at the second end of leaf spring 1312A, and is configured to mate at any time with one of two mating features on an inner edge of the opening of retainer ring 1316A.

Figure 15:
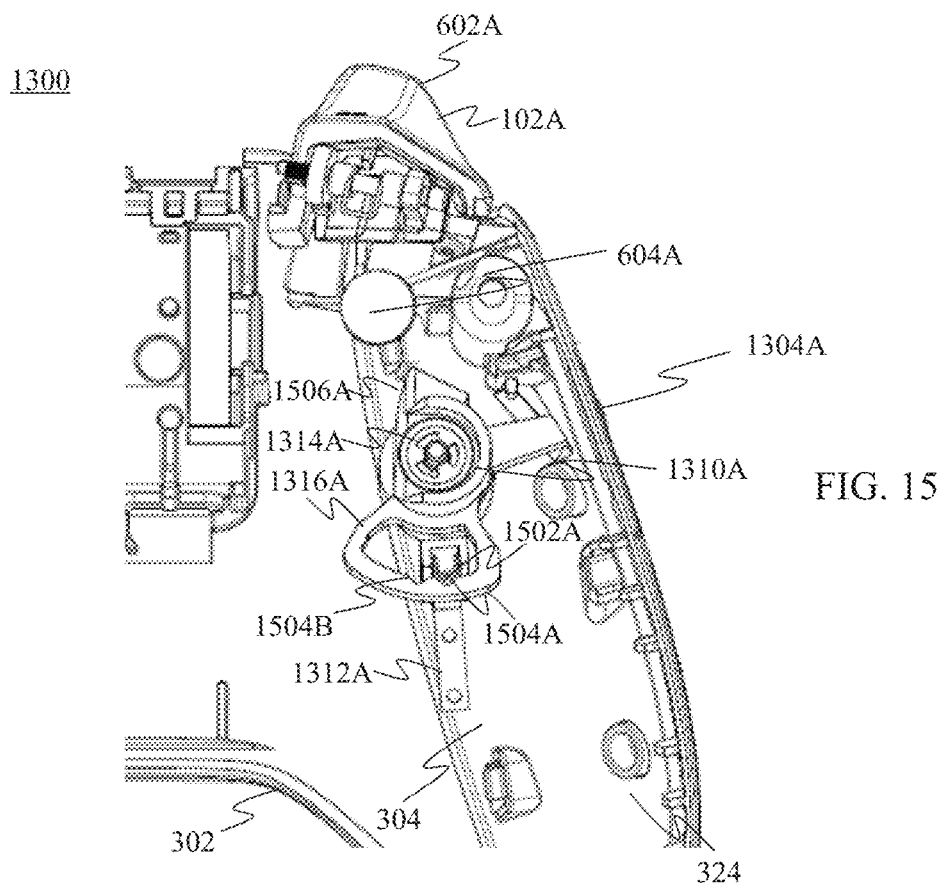
FIG. 15 shows a top view of a portion of the user input device of FIG. 13 with trigger in the full travel mode, according to an example embodiment.

For instance, FIG. 15 shows a top view of a portion of user input device 1300 with trigger button 102A in the full travel mode, according to an example embodiment. FIG. 15 shows a stop barrier 1506A extending from cam 1310A, in a similar manner as stop barrier 410A extends from cam 310A (FIG. 3). Stop barrier 1506A is a barrier that is rotated in and out of a travel path of trigger button 102A when cam 1310A rotates, to reduce or not reduce the travel distance of trigger button 102A when depressed. Stop barrier 1506A can have any suitable shape. For instance, from a top view of cam 1310A (e.g., viewing cam downward in FIG. 15 along an axis through central cylindrical opening 1322A), stop barrier 1506A may be triangular in shape. Stop barrier 1506A may have a surface with a rectangular or other shape that receives backside 604A of trigger button 102A. A foam pad (similar to foam pad 320A of FIG. 3) may be attached to the surface of stop barrier 1506A that receives backside 604A trigger button 102A to cushion the impact.

Switching finger switch 1304A into the second selectable position causes stop barrier 1506A to be rotated out of a travel path of trigger button 102A (step 204 of flowchart 200 in FIG. 2A). Furthermore, mating feature 1502A (e.g., a triangular tab) of leaf spring 1312A mates with first mating feature 1504A (e.g., a triangular notch) of retainer ring 1316A. In this configuration, backside 604A of trigger button 102A does not meet stop barrier 1506A when depressed (e.g., by a finger pressing on the finger receiving surface of the trigger button). Therefore, the trigger button movement is not reduced.

Figure 16:
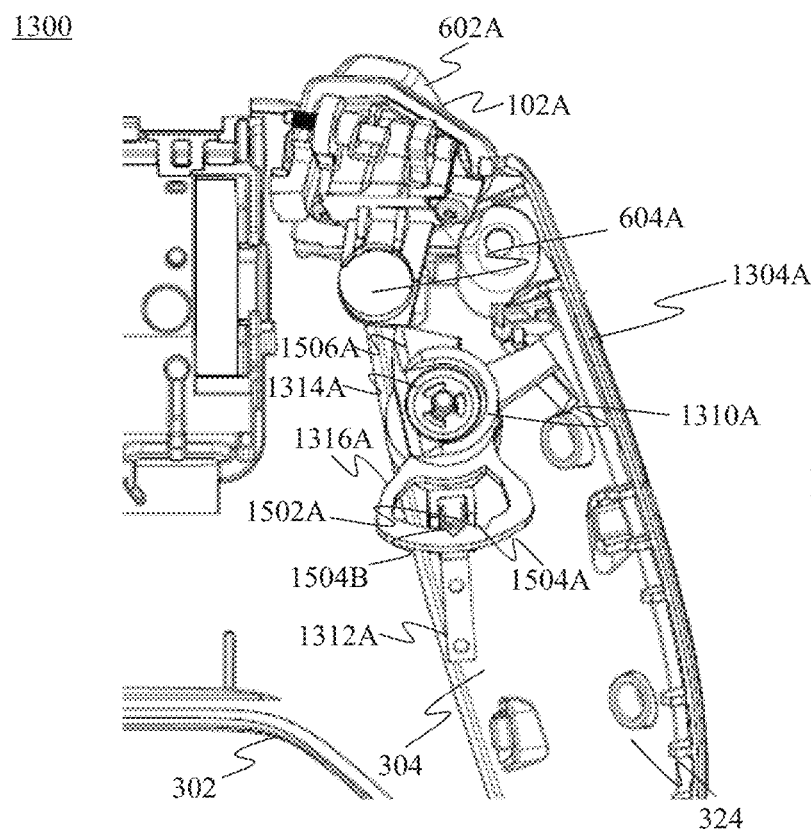
FIG. 16 shows a top view of a portion of the user input device of FIG. 13 with trigger in the partial travel mode, according to an example embodiment.

FIG. 16 shows a top view of the portion of user input device 1300 shown in FIG. 15, with trigger in the partial travel mode, according to an example embodiment. As shown in FIG. 16, switching finger switch 1304A into the first selectable position causes stop barrier 1506A to be rotated into the travel path of trigger button 102A (step 202 of flowchart 200 in FIG. 2A). Furthermore, mating feature 1502A of leaf spring 1312A mates with second mating feature 1504B (e.g., a triangular notch) of retainer ring 1316A. In this configuration, backside 604A is received by stop barrier 1506A when trigger button 102A is depressed, which limits movement of trigger button 102A to the second (shortened) distance.

It is noted that mating feature 1502A of leaf spring 1502A and mating features 1504A and 1504B may operate as a detent mechanism that provides self-stabilization for adjustment assembly 1306A, stabilizing a position of cam 1310A into one of the first and second selectable positions of finger switch 1304A.

For example, leaf spring 1312A (e.g., a strip of metal) exerts a force perpendicular to its length, pushing mating feature 1502A into one of mating features 1504A and 1504B. If finger switch 1304A associated with cam 1310A is positioned between the first and second selectable positions, the force of leaf spring 1312A forces cam 1310A into rotating such that mating feature 1502A on leaf spring 1502A mates with (locks into) either mating feature 1504A or mating feature 1504B, thereby stabilizing a position of finger switch 1304A and trigger button 102A into one of the first and second selectable positions.

Note that in embodiments, retainer ring 1316A may have one or more additional mating features in addition to mating features 1504A and 1504B (additional notches or tabs) complementary to mating feature 1502A to enable a greater number of lock positions, and therefore a greater number of selectable positions for trigger button travel distance (e.g., 15% of full, 30% of full).

Figure 17:
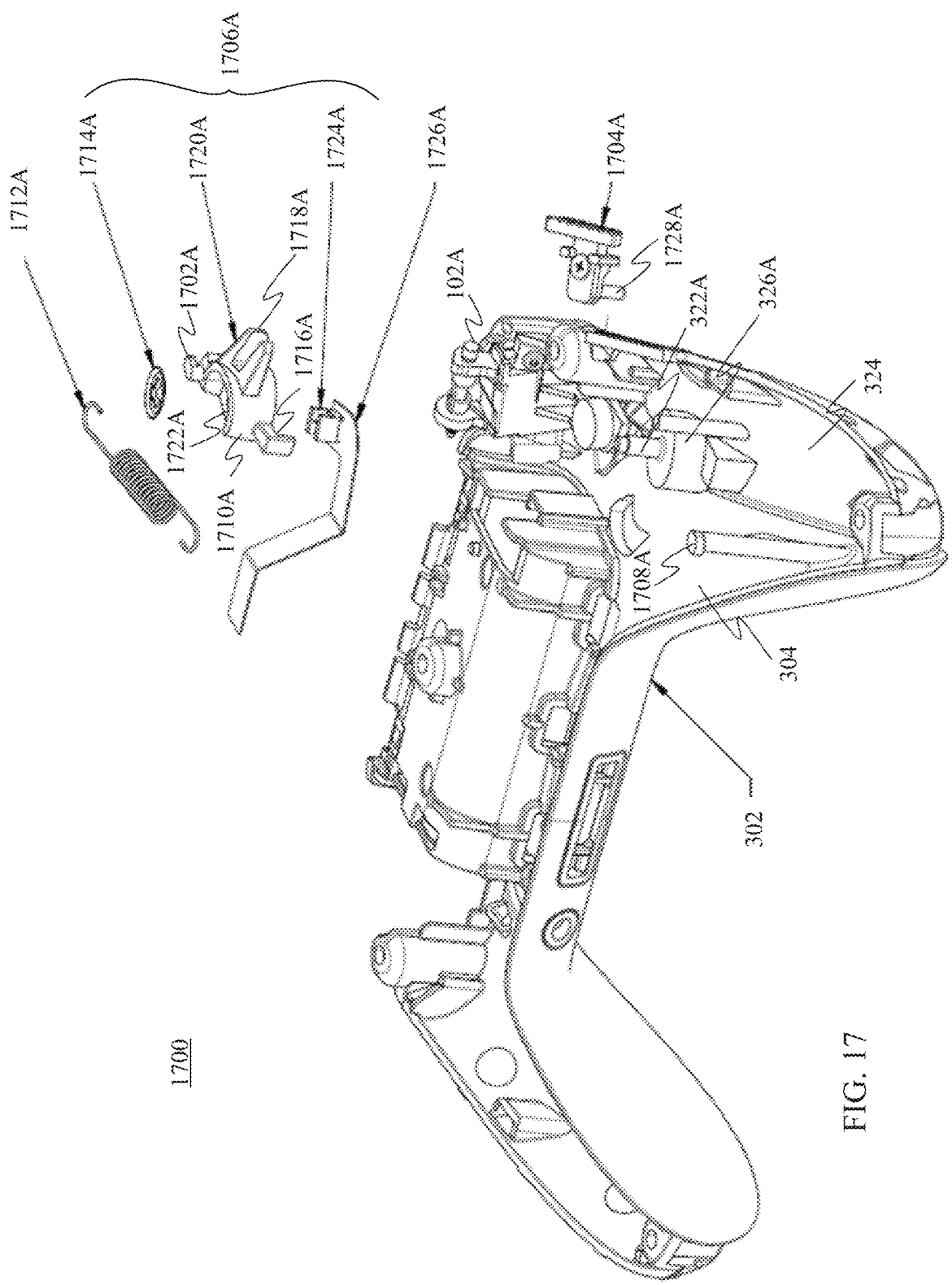
FIG. 17 shows a perspective diagram of a user input device with an exploded view of an interior assembly for adjusting travel distance of a trigger button, having a side control switch and an extension spring, according to an example embodiment.

C. Example Embodiments for a Trigger Travel Stop with Extension Spring and Actuated with Side Switch FIG. 17 shows a perspective diagram of a user input device 1700, according to another example embodiment. FIG. 17 provides an exploded view of a trigger travel path adjustment assembly 1702 in user input device 1700 that is controlled with a side control switch, according to another example embodiment. Adjustment assembly 1702 and user input device 1700 are described as follows.

Similar to user input device 300 of FIG. 3, user input device 1700 includes a case or housing 302 that defines an internal cavity 304 for internal components of user input device 1700. In FIG. 17, a bottom portion of housing 302 is shown, while a top portion of housing 302 is not shown for ease of illustration. Some features of user input device 1700 that are shown in FIG. 17 are not described for purposes of brevity, and user input device 1700 may include further features not shown in FIG. 17.

As shown in FIG. 17, user input device 1700 includes a first trigger travel path adjustment assembly 1706A that resides in cavity 304, and corresponds to trigger button 102A. A second adjustment assembly for a second trigger is not shown in FIG. 17, but may be present in embodiments. Adjustment assembly 1706A is shown in exploded form. Finger switch 1704A is configured to be switched between first and second selectable positions in real-time. Finger switch 1704A is shown in FIG. 17 as a part of a finger switch assembly that further includes an interface portion that is attached to finger switch 1704A by a connection member (e.g., a screw in FIG. 17). A post 1728A extends downward in FIG. 17 from the interface portion of the finger switch assembly. The interface portion can pivot relative to finger switch 1704A at an axis defined by the connection member.

A first selectable position of finger switch 1704A (e.g., upward/into the page in FIG. 17) causes adjustment assembly 1706A to enable trigger button 102A to be depressed a first distance (first mode; partial travel distance mode). A second selectable position of finger switch 1704A (e.g., downward/out of the page in FIG. 17) causes adjustment assembly 1706A to enable trigger button 102A to be depressed a second distance that is greater than the first distance (second mode; full travel distance mode).

As shown in FIG. 17, adjustment assembly 1706A includes a cam 1710A, an extension spring 1712A, a cap 1714A, an optional sensor 1724A, an optional circuit connection 1726A, and an optional foam pad (not visible in FIG. 17). Cam 1710A may be made from any suitable material, such as a plastic, a resin, a metal, etc. Cam 1710A is a component that is rotated by a user interacting with finger switch 1704A on the side of housing 302. Moving finger switch 1704A into the first selectable position rotates cam 1710A such that the associated trigger button is placed in partial travel mode. Moving finger switch 1704A into the second selectable position rotates cam 1710A such that the associated trigger button is placed in full travel mode.

Cam 1710A may be configured in various ways to perform its functions. For instance, as shown in FIG. 17, cam 1710A is defined by a body 1720A, a first flange 1702A, a second flange 1716A, a central cylindrical opening 1722A through body 1720A, an arm 1718A, a stop barrier (not visible in FIG. 17), and an optional tab (not visible in FIG. 17; similar to tab 414A described above).

Central cylindrical opening 1722A in body 1720A is configured to receive post 322A extending from inner surface 324 of housing 302. When fitted on post 322A, cam 1710A is configured to be rotatable at least partially around post 322A.

Arm 1718A extends from the outer surface of body 1720A. Arm 1718A is configured to couple with the finger switch assembly that includes finger switch 1704A. For example, in an embodiment, arm 1718A includes a slot opening configured to receive post 1728A. Finger switch 1704A is configured to slide back and forth (under control of a user) on the side of housing 302. Finger switch 1704A is coupled to arm 1718A inside housing 302 through a slot in the side of housing 302. In particular, post 1728A of the finger switch assembly is inserted in the slot opening in arm 1718A to coupled finger switch 1704A to arm 1718A. As such, when finger switch 1704A is moved back and forth between selectable positions, the interface portion of the finger switch assembly swivels slightly around the connection member (e.g., screw) to provide compliance for movement of post 1728A with finger switch 1704A. The movement of post 1728A with finger switch 1704A causes arm 1718A to correspondingly move with finger switch 1704A, thereby rotating cam 1710A with the movement of finger switch 1704A.

Accordingly, in one embodiment, finger switch 1704A is configured to slide on an outer side surface of housing 302, and includes post 1728A to interface with arm 1718A of cam 1710A. In an alternative embodiment, an end of arm 1718A may extend outside of the side slot, and may itself be the finger switch, or a finger switch may be attached to the end of arm 1718A (similar to the embodiment of FIGS. 13-16).

Extension spring 1712A has a first end (e.g., a hook) attached to inner surface 324 of housing 302 at a mount point 1708A (e.g., a hook, flange) and a second end (e.g., a hook) that is attached to first flange 1702A (e.g., a hook, a tab), which is a mount point on cam 1710A. Extension spring 1712A provides a bias force that enables self-stabilization of adjustment assembly 1706A. Extension spring 1712A is configured as an over center toggle to stabilize a position of cam 1710A into one of the first and second selectable positions of finger switch 1704A.

Figure 18:
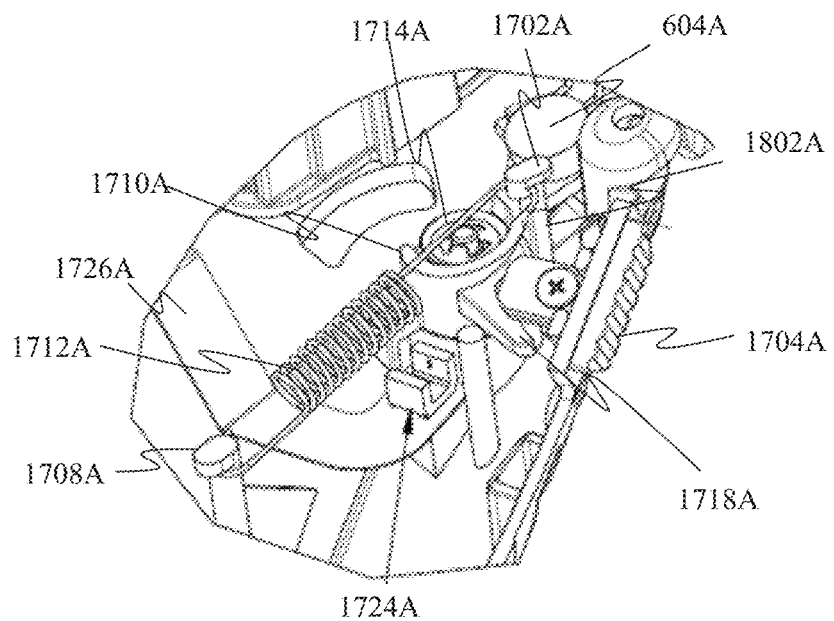
FIG. 18 shows a cutaway view of the user input device of FIG. 17, with the trigger in the full travel mode, according to an example embodiment.

For instance, FIG. 18 shows a cutaway view of user input device 1700, with trigger button 102A in the full travel mode, according to an example embodiment. A stop barrier 1802A extending from cam 1710A, in a similar manner as stop barrier 410A extends from cam 310A (FIG. 3), is a barrier that is rotated in and out of a travel path of trigger button 102A when cam 1710A rotates, to reduce or not reduce the travel distance of trigger button 102A when depressed. Stop barrier 1802A can have any suitable shape, such as is described elsewhere herein. A foam pad (similar to foam pad 320A of FIG. 3) may be attached to the surface of stop barrier 1802A that receives backside 604A of trigger button 102A, to cushion the impact.

Switching finger switch 1704A into the second selectable position causes stop barrier 1802A to be rotated out of a travel path of trigger button 102A (step 204 of flowchart 200 in FIG. 2A). In this configuration, backside 604A of trigger button 102A does not meet stop barrier 1802A of cam 1710A when depressed (e.g., by a finger pressing on the finger receiving surface of the trigger button). Therefore, the trigger button movement is not reduced.

Furthermore, extension spring 1712A applies a contraction force between flange 1702A and mount point 1708A. Extension spring 1712A is at fullest extension when cam 1710A is rotated between the first and second selectable positions, because at this midway point, flange 1702A on cam 1710A is at its further distance from mount point 1708A. As such, if the user did not move finger switch 1704A fully into the second selectable position, or if cam 1710A is otherwise rotated even slightly off center (the fullest extension point), towards the position shown in FIG. 18, extension spring 1712A is configured to pull, thereby rotating cam 1710A fully into the position shown in FIG. 18.

Figure 19:
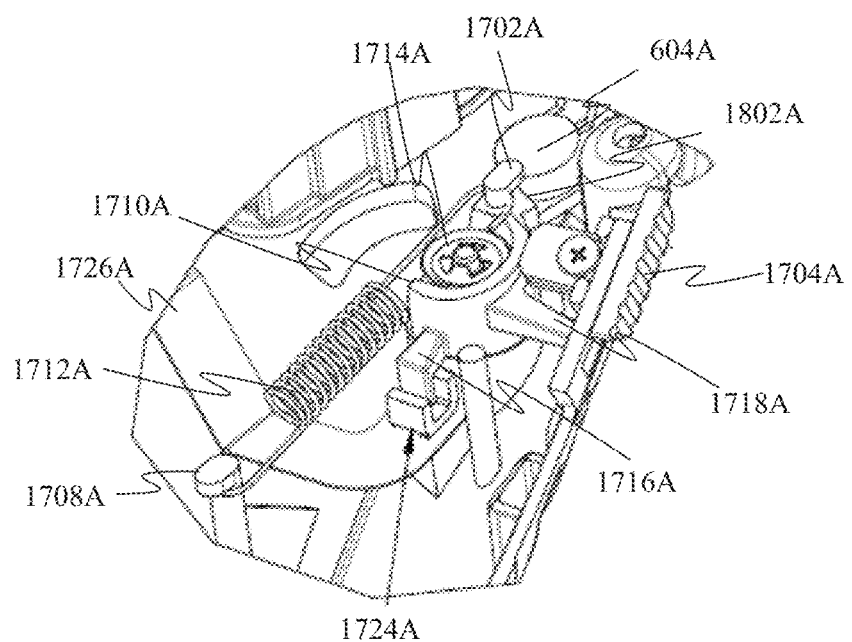
FIG. 19 shows a cutaway view of the user input device of FIG. 17, with the trigger in the partial travel mode, according to an example embodiment.

FIG. 19 shows the cutaway view of user input device 1700 of FIG. 18, with trigger button 102A in the partial travel mode, according to an example embodiment. Stop barrier 1802A of cam 1710A is visible in FIG. 19. As shown in FIG. 19, switching finger switch 1704A into the first selectable position causes stop barrier 1802A to be rotated into the travel path of trigger button 102A (step 202 of flowchart 200 in FIG. 2A). In this configuration, backside 604A is received by stop barrier 1802A when trigger button 102A is depressed, which limits movement of trigger button 102A to the second (shortened) distance.

Furthermore, as described above, extension spring 1712A applies a contraction force between flange 1702A and mount point 1708A. Extension spring 1712A is at fullest extension when cam 1710A is rotated between the first and second selectable positions. As such, if the user did not move finger switch 1704A fully into the first selectable position, or if cam 1710A is otherwise rotated even slightly off center (the fullest extension point), towards the position shown in FIG. 19, extension spring 1712A is configured to pull, thereby rotating cam 1710A fully into the position shown in FIG. 19.

D. Example Embodiments for Detecting Partial Travel Distance Mode

In embodiments, each of the adjustable trigger travel distance configurations described herein (e.g., shown in FIGS. 3-19) can be configured to detect whether the "hair trigger" mode (partial travel mode) is activated for a particular trigger button. In other words, if a user switches a trigger button into partial travel mode from full travel mode, a user input device may be configured to detect that the switch into partial travel mode has occurred. Such detection may be enabled in various ways, including the use of one or more sensors (e.g., proximity sensors, position sensors, optical sensor, Hall effect sensor), switches (e.g., TACT switch) and/or other mechanisms configured to make the detection. The detection may be conveyed to electrical circuitry (e.g., processing logic, a processor circuit that executes program code, electrical circuit components) of the user input device in any manner, including by a wired and/or wireless electrical connection.

For instance, in one embodiment, a Hall effect sensor may be used to detect switching into the partial travel mode from the full travel mode. A Hall effect sensor is a transducer that varies its output voltage in response to a magnetic field. Accordingly, movement of trigger button 102A may move a magnet (e.g., attached to the backside of trigger button 102A) closer to or further away from a Hall effect sensor in the user input device, to generate a corresponding sensor signal. The sensor signal may be generated as a higher or lower voltage, corresponding to a distance of the magnet being closer or further away from the Hall effect sensor. The sensor signal may be compared to a threshold voltage value by electrical circuitry of the user input device. In one embodiment, if the sensor signal exceeds the threshold value, this means trigger button 102A has been depressed fully (full travel mode), and if the sensor signal is less than the threshold value, this means trigger button 102A has been depressed partially (partial travel mode).

In another embodiment, direct TACT switch (or other type of switch/actuator) firing may be used to detect switching into the partial travel mode from the full travel mode. In such an embodiment, a user may move finger switch 1704A into the first selectable position (partial travel mode), which positions a TACT switch in the travel path of trigger button 102A. For instance, the TACT switch may be mounted onto a cam, and may be rotated into the travel path when the finger switch is moved into the first selectable position. When in the first selectable position, depressing trigger button 102A causes the backside of trigger button 102A to push on the TACT switch in the midst of its travel path, thereby closing the TACT switch. Closing the TACT switch indicates that trigger button 102A is being depressed while in partial travel mode. Data may be cyclically checked to determine whether the TACT switch is closed. In an embodiment, if the TACT switch is closed by movement of the trigger, an output signal of a Hall effect sensor (or other sensor that is present to detect a full trigger movement) is ignored, and the trigger is indicated as being 100% pulled. If the TACT switch is not closed, the Hall effect sensor (or other sensor present) generates an output signal indicating the position of the trigger.

FIG. 19 illustrates another example embodiment using a sensor 1724A that is an optical sensor. When finger switch 1704A is switched into the first selectable position, as shown in FIG. 19, second flange 1716A is rotated on cam 1710A through a light signal transmitted across a gap formed by sensor 1724A. When the light signal is broken by second flange 1716A, sensor 1724A senses the interruption of the light signal, and transmits an indication of the interruption through circuit connection 1726A to electrical circuitry of the user input device, which registers the mode change into the partial travel mode. When the finger switch 1704A is switched into the second selectable position (e.g., as shown in FIG. 18), second flange 1716A is rotated on cam 1710A out of the light signal transmitted across a gap. As such, the light signal is no longer broken by second flange 1716A. Sensor 1724A again senses the light signal, and transmits an indication through circuit connection 1726A to electrical circuitry that indicates the mode change into the full travel mode.

IV. Example Embodiments

In one embodiment, a user input device comprises: a finger depressible trigger button; a trigger travel path adjustment assembly that resides in an internal cavity of a housing of the user input device; and a finger switch configured to be switched between a plurality of selectable positions in real-time, a first selectable position of the finger switch causing the adjustment assembly to enable the trigger button to be depressed a first distance and a second selectable position of the finger switch causing the adjustment assembly to enable the trigger button to be depressed a second distance that is greater than the first distance.

In an embodiment, the adjustment assembly comprises: a cam defined by a body, a central cylindrical opening in the body that receives a post extending from an inner surface of the housing, the cam configured to be rotatable at least partially around the post, an arm that extends from an outer surface of the body to be coupled to the finger switch and that enables the cam to be rotated by movement of the finger switch, and a stop barrier that extends from the outer surface of the body; and the trigger button having a finger receiving surface and a backside opposed to the finger receiving surface; the finger switch in the first selectable position causing the stop barrier to be rotated into the travel path of the trigger button, to receive the trigger backside and limit movement of the trigger button to the first distance; and the finger switch in the second selectable position causing the stop barrier to be rotated out of a travel path of the trigger button.

In an embodiment, the adjustment assembly further comprises: a slot cover; and an elongated connection member that connects the slot cover, the arm, and the finger switch; the finger switch having a first portion extending outside of the housing through a slot in the housing and a second portion inside the housing to which the elongated connection member connects; and the slot cover configured to rotate around the post with the arm to cover an open portion of the slot in the first and second selectable positions of the finger switch.

In an embodiment, the finger switch has a first portion extending outside of the housing through a slot in the housing and a second portion inside the housing to which the elongated connection member connects; and the arm includes a slot cover that rotates around the post with the arm to cover an open portion of the slot in the first and second selectable positions of the finger switch.

In an embodiment, the housing comprises a base that extends from the inner surface of the housing, the post extending from the base; and the cam further comprises a tab that extends from a second outer surface of the body of the cam towards the inner surface of the housing, the tab configured to contact a side surface of the base to prevent the cam from being over-rotated.

In an embodiment, the adjustment assembly further comprises: a spring that resides in a cylindrical recess in the body, and a cap that holds the spring at least partially compressed in the cylindrical recess; the cam further comprises a first mating features at a second outer surface of the body of the cam; the housing comprises a base that extends from the inner surface of the housing, the base having a surface that includes a second mating feature configured to mate with the first mating feature in the first selectable position of the finger switch, and a third mating feature configured to mate with the first mating feature in the second selectable position of the finger switch; and the spring is configured to stabilize a position of the cam into one of the first and second selectable positions of the finger switch by forcing rotation of the cam into mating the first and second mating features or mating the first and third mating features.

In an embodiment, the adjustment assembly further comprises: a foam pad attached to a surface of the stop barrier, the foam pad configured to cushion an impact of the trigger backside into the stop barrier.

In an embodiment, the arm extends outside of the housing through a slot, and an end of the arm is the finger switch.

In an embodiment, the finger switch is configured to slide on an outer side surface of the housing, wherein the finger switch includes a backside post that extends into the housing through a slot, and an end of the backside post is coupled to an end of the arm.

In an embodiment, the user input device further comprises: a leaf spring that extends from the inner surface of the housing and has a first mating feature at an end; and the cam further comprising a retainer ring that extends from the outer surface of the body and that includes second and third mating features, and that is configured to stabilize a position of the cam into one of the first and second selectable positions of the finger switch by forcing rotation of the cam into mating the first mating feature with one of the second or third mating features.

In an embodiment, the adjustment assembly further comprises: a spring coupled between a first mount feature of the cam and a second mount feature extending from the inner surface of the housing, the spring configured as an over center toggle to stabilize a position of the cam into one of the first and second selectable positions of the finger switch.

In another embodiment, a trigger travel path adjustment assembly is configured to reside in an internal cavity of a housing of a user input device. The trigger path adjustment assembly comprises: a cam defined by a body, a central cylindrical opening in the body that receives a post extending from an inner surface of the housing, the cam configured to be rotatable at least partially around the post, an arm that extends from an outer surface of the body to be coupled to a finger switch of the user input device and that enables the cam to be rotated by movement of the finger switch, and a stop barrier that extends from the outer surface of the body; and the trigger button having a finger receiving surface and a trigger backside opposed to the finger receiving surface; the finger switch in a first selectable position causing the stop barrier to be rotated into the travel path of the trigger button, to receive the trigger backside and limit movement of the trigger button to a first distance; and the finger switch in a second selectable position causing the stop barrier to be rotated out of a travel path of the trigger button to enable the trigger button to be depressed a second distance that is greater than the first distance.

In an embodiment, the trigger path adjustment assembly further comprises: a slot cover; and an elongated connection member that connects the slot cover, the arm, and the finger switch; the finger switch having a first portion extending outside of the housing through a slot in the housing and a second portion inside the housing to which the elongated connection member connects; and the slot cover configured to rotate around the post with the arm to cover an open portion of the slot in the first and second selectable positions of the finger switch.

In an embodiment, the finger switch has a first portion extending outside of the housing through a slot in the housing and a second portion inside the housing to which the elongated connection member connects; and the arm includes a slot cover that rotates around the post with the arm to cover an open portion of the slot in the first and second selectable positions of the finger switch.

In an embodiment, the adjustment assembly further comprises: a spring that resides in a cylindrical recess in the body, and a cap that holds the spring at least partially compressed in the cylindrical recess; the cam further comprises a first mating feature at a second outer surface of the body of the cam; the housing comprises a base that extends from the inner surface of the housing, the base having a surface that includes a second mating feature configured to mate with the first mating feature in the first selectable position of the finger switch, and a third mating feature configured to mate with the first mating feature in the second selectable position of the finger switch; and the spring is configured to stabilize a position of the cam into one of the first and second selectable positions of the finger switch by forcing rotation of the cam into mating the first and second mating features or mating the first and third mating features.

In an embodiment, the finger switch is configured to slide on an outer side surface of the housing, the finger switch includes a backside post that extends into the housing through a slot, and an end of the backside post is coupled to an end of the arm.

In an embodiment, a leaf spring extends from the inner surface of the housing and has a first mating feature at an end; and the cam further comprising a retainer ring that extends from the outer surface of the body and that includes second and third mating features, and that is configured to stabilize a position of the cam into one of the first and second selectable positions of the finger switch by forcing rotation of the cam into mating the first mating feature with one of the second or third mating features.

In an embodiment, the adjustment assembly further comprises: a spring coupled between a first mount feature of the cam and a second mount feature extending from the inner surface of the housing, the spring configured as an over center toggle to stabilize a position of the cam into one of the first and second selectable positions of the finger switch.

In another embodiment, a method for interacting with a user input device that has a trigger button is presented, comprising: positioning a stop barrier into a travel path of the trigger button in response to a user interacting with a finger switch accessible on the user input device during gameplay, thereby transitioning to a first mode, the trigger button enabled to be depressed a first distance with the stop barrier in the travel path in the first mode; and positioning the stop barrier out of the travel path of the trigger button in response to the user interacting with the finger switch during gameplay, thereby transitioning from the first mode to the second mode, the trigger button enabled to be depressed a second distance with the stop barrier out of the travel path, the second distance greater than the first distance.

In an embodiment, the method further comprises: self-stabilizing the finger switch into one of the first mode or the second mode.

V. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A user input device, comprising:
   a travel path adjustment assembly that resides in an internal cavity of a housing of the user input device; and
   a switch configured to be switched between a plurality of selectable positions in real-time, a first selectable position of the switch causing the adjustment assembly to position a stop barrier into a travel path to enable a button to be depressed a first distance and a second selectable position of the switch causing the adjustment assembly to enable the button to be depressed a second distance that is greater than the first distance, the stop barrier repositionable in directions different from a direction of the travel path.

2. The user input device of claim 1, wherein the adjustment assembly comprises:
a cam defined by
a body,
a central opening in the body that receives a post extending from an inner surface of the housing, the cam configured to be rotatable at least partially around the post,
an arm that extends from an outer surface of the body to be coupled to the switch and that enables the cam to be rotated by movement of the switch, and
the stop barrier extending from the outer surface of the body; and
the button having a finger receiving surface and a backside opposed to the finger receiving surface;
the switch in the first selectable position causing the stop barrier to be rotated into the travel path of the button, to receive the backside and limit movement of the button to the first distance; and
the switch in the second selectable position causing the stop barrier to be rotated out of a travel path of the button.

3. The user input device of claim 2, wherein the adjustment assembly further comprises:
a slot cover; and
an elongated connection member that connects the slot cover, the arm, and the switch;
the switch having a first portion extending outside of the housing through a slot in the housing and a second portion inside the housing to which the elongated connection member connects; and
the slot cover configured to rotate around the post with the arm to cover an open portion of the slot in the first and second selectable positions of the switch.

4. The user input device of claim 2, wherein the switch has a first portion extending outside of the housing through a slot in the housing and a second portion inside the housing to which the elongated connection member connects; and
the arm includes a slot cover that rotates around the post with the arm to cover an open portion of the slot in the first and second selectable positions of the switch.

5. The user input device of claim 2, wherein the housing comprises a base that extends from the inner surface of the housing, the post extending from the base; and
the cam further comprises
a tab that extends from a second outer surface of the body of the cam towards the inner surface of the housing, the tab configured to contact a side surface of the base to prevent the cam from being over-rotated.

6. The user input device of claim 2, wherein the adjustment assembly further comprises:
a spring that resides in a recess in the body, and
a cap that holds the spring at least partially compressed in the recess;
the cam further comprises
a first mating features at a second outer surface of the body of the cam;
the housing comprises
a base that extends from the inner surface of the housing, the base having a surface that includes a second mating feature configured to mate with the first mating feature in the first selectable position of the switch, and a third mating feature configured to mate with the first mating feature in the second selectable position of the switch; and
the spring is configured to stabilize a position of the cam into one of the first and second selectable positions of the switch by forcing rotation of the cam into mating the first and second mating features or mating the first and third mating features.

7. The user input device of claim 2, wherein the arm extends outside of the housing through a slot, and an end of the arm is the switch.

8. The user input device of claim 2, wherein the switch is configured to slide on an outer side surface of the housing, wherein the switch includes a backside post that extends into the housing through a slot, and an end of the backside post is coupled to an end of the arm.

9. The user input device of claim 2, further comprising:
a leaf spring that extends from the inner surface of the housing and has a first mating feature at an end; and
the cam further comprising
a retainer ring that extends from the outer surface of the body and that includes second and third mating features, and that is configured to stabilize a position of the cam into one of the first and second selectable positions of the switch by forcing rotation of the cam into mating the first mating feature with one of the second or third mating features.

10. The user input device of claim 2, wherein the adjustment assembly further comprises:
a spring coupled between a first mount feature of the cam and a second mount feature extending from the inner surface of the housing, the spring configured as an over center toggle to stabilize a position of the cam into one of the first and second selectable positions of the switch.

11. A travel path adjustment assembly configured to reside in an internal cavity of a housing of a user input device, the path adjustment assembly comprising:
a stop barrier; and
a switch;
wherein, in response to the switch positioned in a first selectable position, the stop barrier is positioned into a travel path of a button to limit movement of the button to a first distance, the stop barrier repositionable in directions different from a direction of the travel path; and
in response to the switch positioned in a second selectable position, the stop barrier is rotated out of the travel path of the button to enable the button to be depressed a second distance that is greater than the first distance.

12. The path adjustment assembly of claim 11, the path adjustment assembly comprising:
a cam defined by
a body,
a central opening in the body that receives a post extending from an inner surface of the housing, the cam configured to be rotatable at least partially around the post,
an arm that extends from an outer surface of the body to be coupled to a switch of the user input device and that enables the cam to be rotated by movement of the switch, and
the stop barrier extending from the outer surface of the body.

13. The path adjustment assembly of claim 12, further comprising:

a slot cover; and an elongated connection member that connects the slot cover, the arm, and the switch;

the switch having a first portion extending outside of the housing through a slot in the housing and a second portion inside the housing to which the elongated connection member connects; and the slot cover configured to rotate around the post with the arm to cover an open portion of the slot in the first and second selectable positions of the switch.

14. The path adjustment assembly of claim 12, wherein the switch has a first portion extending outside of the housing through a slot in the housing and a second portion inside the housing to which the elongated connection member connects; and the arm includes a slot cover that rotates around the post with the arm to cover an open portion of the slot in the first and second selectable positions of the switch.

15. The path adjustment assembly of claim 12, wherein the adjustment assembly further comprises:

a spring that resides in a recess in the body, and a cap that holds the spring at least partially compressed in the recess;

the cam further comprises a first mating feature at a second outer surface of the body of the cam;

the housing comprises a base that extends from the inner surface of the housing, the base having a surface that includes a second mating feature configured to mate with the first mating feature in the first selectable position of the switch, and a third mating feature configured to mate with the first mating feature in the second selectable position of the switch; and the spring is configured to stabilize a position of the cam into one of the first and second selectable positions of the switch by forcing rotation of the cam into mating the first and second mating features or mating the first and third mating features.

16. The path adjustment assembly of claim 12, wherein the switch is configured to slide on an outer side surface of the housing, the switch includes a backside post that extends into the housing through a slot, and an end of the backside post is coupled to an end of the arm.

17. The path adjustment assembly of claim 12, wherein a leaf spring extends from the inner surface of the housing and has a first mating feature at an end; and the cam further comprising a retainer ring that extends from the outer surface of the body and that includes second and third mating features, and that is configured to stabilize a position of the cam into one of the first and second selectable positions of the switch by forcing rotation of the cam into mating the first mating feature with one of the second or third mating features.

18. The path adjustment assembly of claim 12, wherein the adjustment assembly further comprises:

a spring coupled between a first mount feature of the cam and a second mount feature extending from the inner surface of the housing, the spring configured as an over center toggle to stabilize a position of the cam into one of the first and second selectable positions of the switch.

19. A method for interacting with a user input device, comprising:

positioning a stop barrier in into a travel path of a button in response to a user interacting with a switch accessible on the user input device, the button enabled to be depressed a first distance with the stop barrier in the travel path in the first mode, the stop barrier repositionable in directions different from a direction of the travel path; and positioning the stop barrier out of the travel path of the button in response to the user interacting with the switch, the button enabled to be depressed a second distance with the stop barrier out of the travel path, the second distance greater than the first distance.

20. The method of claim 19, further comprising:

repositioning the stop barrier back into the travel path of the button in response to the user interacting with the switch.

* * * * *